(12) United States Patent
Clements et al.

(10) Patent No.: US 10,823,114 B2
(45) Date of Patent: Nov. 3, 2020

(54) COUNTER ROTATING TURBINE WITH REVERSING REDUCTION GEARBOX

(71) Applicant: General Electric Company, Schenectady, NY (US)

(72) Inventors: Jeffrey Donald Clements, Mason, OH (US); Darek Tomasz Zatorski, Fort Wright, KY (US); Alan Roy Stuart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/535,930

(22) Filed: Aug. 8, 2019

(65) Prior Publication Data

US 2020/0003157 A1    Jan. 2, 2020

Related U.S. Application Data

(63) Continuation-in-part of application No. 15/427,324, filed on Feb. 8, 2017, now Pat. No. 10,465,606.

(51) Int. Cl.
*F02K 3/072* (2006.01)
*F01D 25/18* (2006.01)
*F01D 11/20* (2006.01)
*F01D 5/22* (2006.01)

(52) U.S. Cl.
CPC ............. *F02K 3/072* (2013.01); *F01D 5/225* (2013.01); *F01D 11/20* (2013.01); *F01D 25/18* (2013.01)

(58) Field of Classification Search
CPC .......... F02K 3/072; F01D 5/225; F01D 11/20; F01D 25/18

USPC .............................................. 415/65; 60/268
See application file for complete search history.

(56) References Cited

U.S. PATENT DOCUMENTS

| 3,673,802 A | 7/1972 | Krebs et al. |
| 4,005,575 A | 2/1977 | Scott et al. |
| 4,621,978 A | 11/1986 | Stuart |
| 4,909,031 A | 3/1990 | Grieb |

(Continued)

FOREIGN PATENT DOCUMENTS

GB    2485744 B    2/2016

*Primary Examiner* — Mahmoud Gimie
(74) *Attorney, Agent, or Firm* — Dority & Manning, P.A.

(57) ABSTRACT

The present disclosure is directed to a gas turbine engine defining a longitudinal direction, a radial direction, and a circumferential direction, and an upstream end and a downstream end along the longitudinal direction. The gas turbine engine includes a turbine section, a gearbox proximate to the turbine section, and a driveshaft. The turbine section includes a first rotating component interdigitated with a second rotating component along the longitudinal direction. The first rotating component includes an outer shroud defining a plurality of outer shroud airfoils extended inward of the outer shroud along the radial direction and one or more connecting airfoils coupling the outer shroud to a radially extended rotor. The second rotating component includes an inner shroud defining a plurality of inner shroud airfoils extended outward of the inner shroud along the radial direction. The second rotating component is coupled to an input shaft connected to an input gear of the gearbox. The driveshaft is extended in the longitudinal direction and is connected to an output gear of the gearbox. The first rotating component is coupled to the driveshaft.

49 Claims, 15 Drawing Sheets

(56) References Cited

U.S. PATENT DOCUMENTS

| | | |
|---|---|---|
| 4,947,642 A | 8/1990 | Grieb et al. |
| 4,969,325 A | 11/1990 | Adamson et al. |
| 5,010,729 A | 4/1991 | Adamson et al. |
| 5,274,999 A | 1/1994 | Rohra et al. |
| 6,619,030 B1 | 9/2003 | Seda et al. |
| 6,763,654 B2 | 7/2004 | Orlando et al. |
| 7,186,073 B2 | 3/2007 | Orlando et al. |
| 7,195,446 B2 | 3/2007 | Seda et al. |
| 7,269,938 B2 | 9/2007 | Moniz et al. |
| 7,290,386 B2 | 11/2007 | Orlando et al. |
| 7,296,398 B2 | 11/2007 | Moniz et al. |
| 7,334,981 B2 | 2/2008 | Moniz et al. |
| 7,451,592 B2 | 11/2008 | Taylor et al. |
| 7,594,388 B2 | 9/2009 | Cherry et al. |
| 7,716,914 B2 | 5/2010 | Schilling |
| 7,841,165 B2 | 11/2010 | Orlando et al. |
| 7,882,693 B2 | 2/2011 | Schilling |
| 8,015,798 B2 | 9/2011 | Norris et al. |
| 8,191,352 B2 | 6/2012 | Schilling |
| 8,876,462 B2 | 11/2014 | Balk et al. |
| 9,011,076 B2 | 4/2015 | Suciu et al. |
| 9,022,725 B2 | 5/2015 | Merry et al. |
| 9,028,200 B2 | 5/2015 | Suciu et al. |
| 9,074,485 B2 | 7/2015 | Suciu et al. |
| 9,080,512 B2 * | 7/2015 | Suciu ............... F02C 3/107 |
| 2005/0226720 A1 | 10/2005 | Harvey et al. |
| 2006/0032210 A1 | 1/2006 | Giffin, III et al. |
| 2006/0093469 A1 | 5/2006 | Moniz et al. |
| 2008/0184694 A1 | 8/2008 | Guimbard et al. |
| 2010/0326050 A1 | 12/2010 | Schilling et al. |
| 2012/0282558 A1 | 11/2012 | Kraemer et al. |
| 2013/0000322 A1 | 1/2013 | Silkowski |
| 2013/0219859 A1 | 8/2013 | Suciu et al. |
| 2013/0223992 A1 | 8/2013 | Suciu et al. |
| 2014/0206496 A1 | 7/2014 | McCune et al. |
| 2015/0078888 A1 | 3/2015 | Golshany et al. |
| 2015/0152783 A1 | 6/2015 | Acquisti |
| 2016/0025003 A1 | 1/2016 | Schwarz et al. |
| 2016/0102607 A1 | 4/2016 | Hiernaux |
| 2016/0160681 A1 | 6/2016 | Roach et al. |
| 2016/0195010 A1 | 7/2016 | Roberge |
| 2016/0333734 A1 | 11/2016 | Dowden et al. |
| 2018/0355951 A1 * | 12/2018 | Stuart ............... F01D 25/162 |

* cited by examiner

COUNTER ROTATING TURBINE WITH REVERSING REDUCTION GEARBOX

CROSS-REFERENCE TO RELATED APPLICATIONS

This application is a continuation-in-part application of U.S. application Ser. No. 15/427,324 filed Feb. 8, 2017, which is hereby incorporated by reference in its entirety.

FIELD

The present subject matter relates generally to gas turbine engine architecture. More particularly, the present subject matter relates to reduction gearbox and turbine section arrangement for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional gas turbine engines generally include turbine sections defining a high pressure turbine in serial flow arrangement with an intermediate pressure turbine and/or low pressure turbine. Additionally, conventional gas turbine engine turbine sections generally include successive rows or stages of stationary and rotating airfoils (e.g. vanes and blades). Stationary airfoils or vanes are often employed to direct or otherwise condition a flow of combustion gases before passing across rotating airfoils or blades. Stationary airfoils often require cooling air routed from other areas of the gas turbine engine, such as the compressor section, to mitigate damage from combustion gases. However, routing air from the compressor section to the turbine section, thereby bypassing the combustion section, generally removes energy for combustion and therefore reduces gas turbine engine efficiency.

Furthermore, conventional low pressure turbines often require a plurality of stages to distribute energy or work to operate the fan assembly and/or compressor to which the low pressure turbine is driving. However, the plurality of stages contribute to axial and radial dimensions of the gas turbine engine, which thereby contributes to weight of the overall engine and aircraft to which it is attached, and consequently adversely impacts fuel efficiency, engine performance, and engine and aircraft efficiency.

Known solutions include adding a reduction gearbox between a fan assembly and an engine core, which may reduce the quantity of the plurality of stages of a turbine section necessary to operate the fan assembly and compressor to which it is attached, and may generally provide some net increase in engine efficiency and improvement in fuel consumption. However, adding a reduction gearbox introduces new complexities and limitations to turbine engine design and operation. For example, known reduction gearboxes have an approximately 100% amount of torque or power routed in series from a low pressure turbine through the gearbox to drive a fan assembly. In such known arrangements, routing an approximately entire amount of torque or power from the low pressure turbine through the gearbox to the fan assembly necessitates complex gearbox designs, increased gearbox weight for the stresses and loads from the substantially entire load from the turbine section, and generally larger diameters of gearbox, thereby retaining or increasing radial dimensions of the engine.

Still further, known solutions including reduction gearboxes in which approximately 100% of torque or power from the low pressure turbine is directed through the gearbox to the fan assembly renders a systemic failure of the gearbox as a single point of failure. In such an arrangement, loss of gearbox operation results in loss of substantially all power from the low pressure turbine being delivered to the fan assembly, thereby reducing engine thrust or power output to an amount produced solely by the engine core through the core flowpath (e.g. approximately 10% of total thrust).

Therefore, there exists a need for an engine that may incorporate a reduction gearbox while reducing or eliminating adverse effects of gearbox placement, such as increased turbine engine packaging, such as increased diameter, axial length, or both, and/or single-point system failure of low pressure turbine power to the fan assembly.

BRIEF DESCRIPTION

Aspects and advantages of the invention will be set forth in part in the following description, or may be obvious from the description, or may be learned through practice of the invention.

The present disclosure is directed to a gas turbine engine defining a longitudinal direction, a radial direction, and a circumferential direction, and an upstream end and a downstream end along the longitudinal direction. The gas turbine engine includes a turbine section, a gearbox proximate to the turbine section, and a driveshaft. The turbine section includes a first rotating component interdigitated with a second rotating component along the longitudinal direction. The first rotating component includes an outer shroud defining a plurality of outer shroud airfoils extended inward of the outer shroud along the radial direction and one or more connecting airfoils coupling the outer shroud to a radially extended rotor. The second rotating component includes an inner shroud defining a plurality of inner shroud airfoils extended outward of the inner shroud along the radial direction. The second rotating component is coupled to an input shaft connected to an input gear of the gearbox. The driveshaft is extended in the longitudinal direction and is connected to an output gear of the gearbox. The first rotating component is coupled to the driveshaft.

In one embodiment, the gearbox is coupled to the driveshaft at the downstream end and the first rotating component is coupled to the driveshaft between the upstream end and the downstream end.

In another embodiment, the engine defines a torque path from the first rotating component to driveshaft to a fan rotor of a fan assembly, and from the second rotating component to the input shaft to the gearbox, and from the gearbox to the driveshaft to the fan rotor.

In yet another embodiment, the engine further includes an exhaust frame defining one or more exhaust vanes disposed downstream of the first and second rotating components. The gearbox is coupled to the exhaust frame.

In various embodiments, the engine further includes a fan assembly defining one or more rotatable fan stages. The fan assembly and the turbine section are in serial arrangement, in which the first rotating component and the second rotating component together define a low pressure turbine rotor, and the low pressure turbine rotor is connected and rotatable with the fan assembly via the driveshaft. In one embodiment, the first rotating component provides between approximately 25% to about 75% of torque to the fan assembly. In another embodiment, the second rotating component provides between approximately 30% to about 60% of torque to the fan assembly.

In still various embodiments, the gearbox defines a gear ratio of about −1.5:1 to about −3:1. In one embodiment, the gearbox defines a range of gear ratios of about −1.8:1 to about −2.8:1.

In another embodiment, the second rotating component rotates at a speed greater than the first rotating component.

In still another embodiment, the first rotating component rotates in a first direction and the second rotating component rotates in a second direction opposite of the first direction. In one embodiment, the gearbox is configured as a reversing gearbox, in which the input shaft and the input gear rotate in the second direction. In another embodiment, the output gear of the gearbox rotates in the first direction.

In one embodiment, the second rotating component is disposed downstream of the connecting airfoil of the first rotating component, and the outer shroud of the first rotating component extends downstream of the connecting airfoil.

In various embodiments, the turbine section defines, in serial arrangement along the longitudinal direction from the upstream end to the downstream end, the first rotating component, the second rotating component, and the first rotating component.

In still various embodiments, the turbine section further includes a third rotating component defining a plurality of third airfoils extended outwardly along the radial direction, in which the third rotating component is disposed upstream of the connecting airfoil of the first rotating component. In one embodiment, the outer shroud of the first rotating component further extends upstream of the connecting airfoil, and the outer shroud further defines a plurality of outer shroud airfoils extended inwardly along the radial direction and interdigitated among the plurality of third airfoils of the third rotating component. In another embodiment, the third rotating component defines a high pressure turbine rotor or an intermediate pressure turbine rotor. In still another embodiment, the turbine section defines, in serial arrangement along the longitudinal direction from the upstream end to the downstream end, the third rotating component defining a first stage, the first rotating component defining a second stage, the third rotating component defining a third stage, and the connecting airfoil of the first rotating component defining a fourth stage.

In another embodiment, the first and second rotating components together defining the low pressure turbine rotor together define between about 3 and 10 stages of rotating airfoils.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
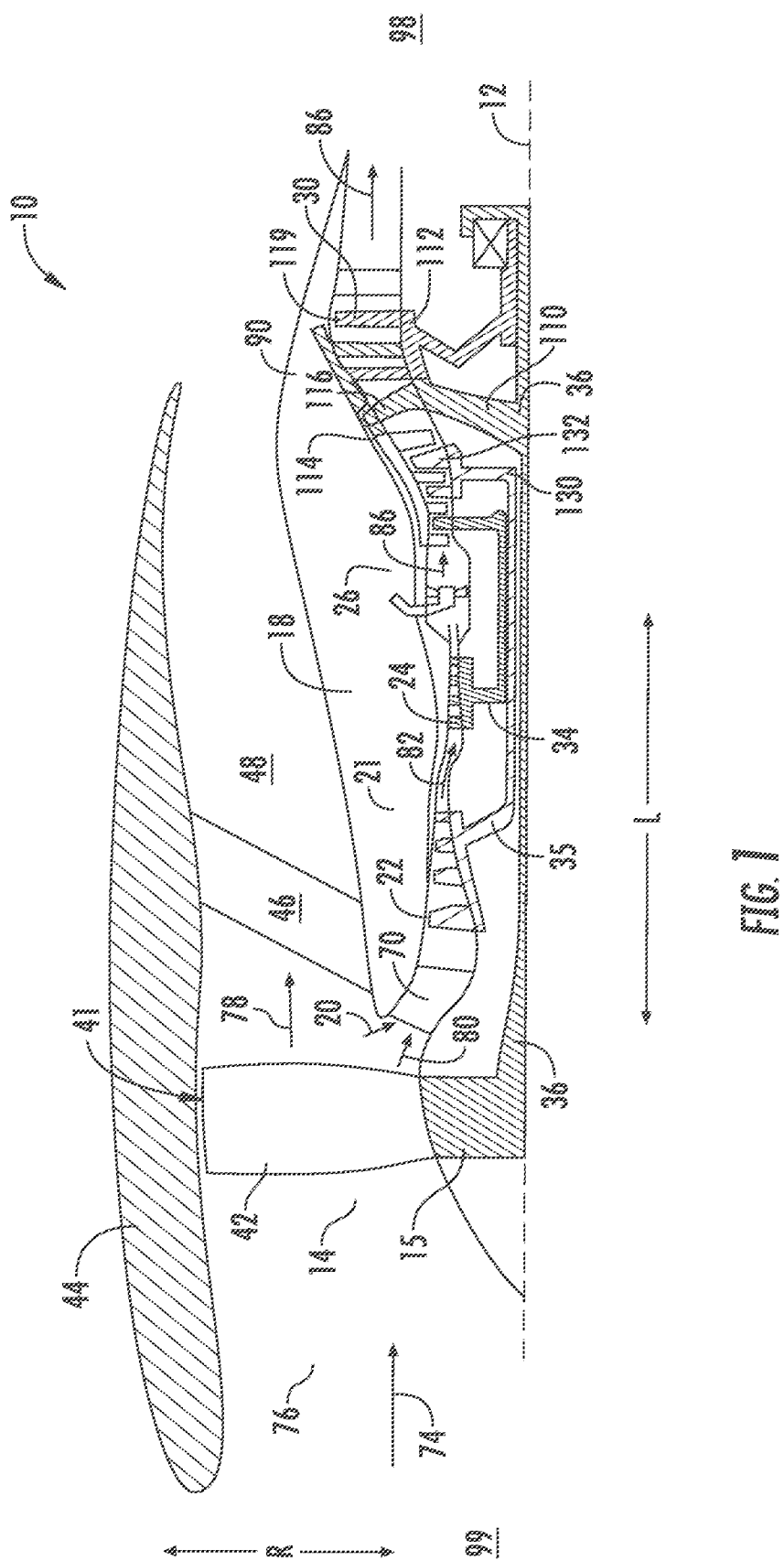
FIG. 1 is a schematic cross sectional view of an exemplary gas turbine engine incorporating an exemplary embodiment of a turbine section and reduction gearbox according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A counter rotating turbine with reversing reduction gearbox is generally provided. The counter rotating turbine with reversing reduction gearbox incorporates a reduction gearbox to a gas turbine engine while reducing or eliminating adverse effects of gearbox placement, such as increased turbine engine packaging, such as diameter or axial length, or both, and/or reducing or eliminating single-point system failure of low pressure turbine power to the fan assembly.

The counter rotating turbine engine with reversing reduction gearbox generally includes a turbine section, including a first rotating component interdigitated with a second rotating component along a longitudinal direction, a gearbox proximate to the turbine section (i.e. within the turbine section or downstream of the turbine section) and connected at an input gear to an input shaft connected to the second rotating component, and a driveshaft connected to the first rotating component and to an output gear of the gearbox. The first rotating component includes an outer shroud defining a plurality of outer shroud airfoils extended inward of the outer shroud along the radial direction. The first rotating component further includes one or more connecting airfoils coupling the outer shroud to a radially extended rotor. The second rotating component includes an inner shroud defining a plurality of inner shroud airfoils extended outward of the inner shroud along the radial direction.

In various embodiments, the first rotating component and the second rotating component of the turbine section together define a low pressure turbine rotor. The counter rotating turbine engine with reversing reduction gearbox generally defines a torque path from the first rotating component to the driveshaft to a fan rotor of a fan assembly, and from the second rotating component to the input shaft to the gearbox, and from the gearbox to the driveshaft to the fan rotor. Therefore, the torque path defines from the low pressure turbine rotor a substantially parallel torque path from the low pressure turbine to the fan assembly. In various embodiments, the low pressure turbine rotor may distribute approximately 50% torque from the low pressure turbine rotor, via the second rotating component, to the fan assembly through the gearbox, while the remainder is distributed from the low pressure turbine rotor, via the first rotating component, to the fan assembly directly through the driveshaft to which the fan assembly is coupled.

The counter rotating turbine with reversing reduction gearbox may generally provide to the engine benefits of a reduction gearbox, such as reduced fan rotor rotational speed, increased bypass ratio, reduced fan pressure ratio, decreased fan assembly noise, decreased fuel consumption, and/or increased engine efficiency, while further reducing or mitigating deleterious effects of reduction gearboxes, such as increased gearbox diameter and/or weight due to the magnitude of torque or power routed through the gearbox.

Additionally, the counter rotating turbine with reversing reduction gearbox may further increase engine efficiency and performance by providing a turbine and gearbox arrangement that permits a three-spool engine configuration in substantially the same axial length of a comparable two-spool geared configuration. Therefore, the counter rotating turbine with reversing reduction gearbox may further increase engine efficiency and performance by operating a low pressure turbine rotor at a more desirable operating speed, by operating a fan assembly at a more desirable operating speed, and operating a booster or intermediate pressure compressor at a speed substantially independent of the low pressure turbine rotor, such as non-proportionate of the low pressure turbine rotor.

The interdigitated turbine section of the counter rotating turbine engine may increase fuel efficiency, operational efficiency, and/or power output while reducing weight, part count, and/or packaging (e.g. radial and/or axial dimensions). For example, the interdigitated turbine section may enable a fan assembly to operate at an increased bypass ratio and/or enable the gas turbine engine to operate at an increased overall pressure ratio, thereby increasing fuel efficiency, operational efficiency, and/or power output relative to other engines of similar power output and/or packaging. The interdigitated turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") relative to an engine incorporating a reduction gearbox, while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). In the embodiment shown in FIG. 1, the compressor section 21 defines a high pressure compressor (HPC) 24 and an intermediate pressure compressor (IPC) 22 in serial arrangement.

A fan assembly 14 is disposed forward or upstream 99 of the compressor section 21. The fan assembly 14 includes a fan rotor 15. The fan rotor 15 includes one or more fan stages 41, in which each fan stage 41 defines a plurality of blades 42 that are coupled to and extend outwardly from the fan rotor 15 in the radial direction R. In one embodiment as shown in FIG. 1, the fan rotor 15 defines a single fan stage or single circumferentially adjacent arrangement of the plurality of blades 42. In various other embodiments, the fan assembly 14 may further define a plurality of the stages 41, such as including a low pressure compressor (LPC). The fan rotor 15, and in various embodiments further defining the LPC, are together rotatable about the axial centerline 12. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

During operation of the engine 10, as shown in FIGS. 1-4 collectively, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

Figure 2:
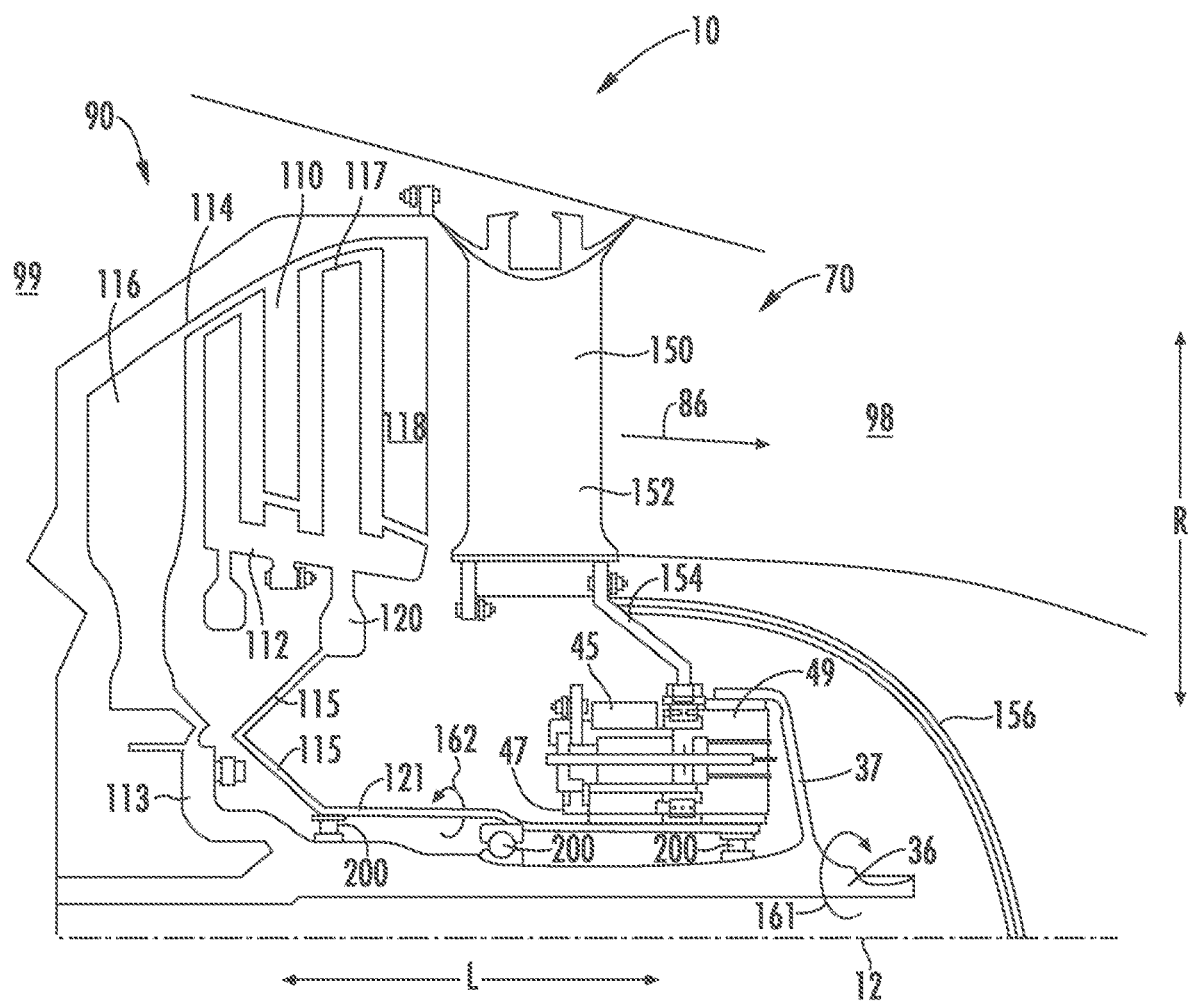
FIG. 2 is a schematic cross sectional view of an embodiment of the turbine section and reduction gearbox shown in FIG. 1.

Referring now to FIG. 2, an exemplary embodiment of the turbine section 90 of the engine 10 is generally provided. The turbine section 90 includes a first rotating component 110 interdigitated with a second rotating component 120 along the longitudinal direction L. The first rotating component 110 includes an outer shroud 114 defining a plurality of outer shroud airfoils 118 extended inward of the outer shroud 114 along the radial direction R. The first rotating component 110 further includes one or more connecting airfoils 116 coupling the outer shroud 114 to a generally radially extended rotor 113. The second rotating component 120 includes an inner shroud 112 defining a plurality of inner shroud airfoils 119 extended outward of the inner shroud 112 along the radial direction R. In various embodiments, the second rotating component 120 further includes a generally radially extended rotor 115 to which the inner shroud 112 attaches. The radially extended rotor 115 of the second rotating component 120 may further attach to an input shaft 121 extended generally along the longitudinal direction L. In various embodiments, the inner shroud 112 and/or the outer shroud 114 are formed or defined by a plurality of hubs, disks, or drums defining an axial or longitudinal flowpath, such as a portion of a core flowpath 70 of compressed air 82 and combustion gases 86 through the engine 10 from the upstream end 99 to the downstream end 98.

In one embodiment as shown in FIG. 2, the second rotating component 120 is disposed aft or downstream 98 of the connecting airfoil 116 of the first rotating component 110. The outer shroud 114 of the first rotating component 110 extends aft or downstream 98 of the connecting airfoil 116. The plurality of outer shroud airfoils 118 extend inward along the radial direction R and interdigitates among the plurality of inner shroud airfoils 119 extended outward along the radial direction R from the inner shroud 112.

In the embodiment shown in FIG. 2, the turbine section 90 defines, in serial flow arrangement along the longitudinal direction from upstream 99 to downstream 98, the connecting airfoil 116 of the first rotating component 110, the second rotating component 120, and the first rotating component 110. In various embodiments, the first and second rotating components 110, 120 may continue in interdigitation from first rotating component 110 to second rotating component 120. For example, in one embodiment, the first and second rotating components 110, 120 may together define at least three stages of rotating airfoils. In another embodiment, the first and second rotating components 110, 120 together define between three and ten stages or rows of rotating airfoils. As used herein in the context of an interdigitated turbine, it will be appreciated that the term "stage" refers to a single row of rotating airfoils (such that the embodiment shown in FIG. 2 is of a turbine having five stages).

The engine 10 further includes a gearbox 45 proximate to the turbine section 90. The gearbox 45 includes an input gear 47 and an output gear 49. The input shaft 121 is connected to the input gear 47 and provides power into the gearbox 45. The second rotating component 120 is coupled to the input shaft 121 and provides power into the gearbox 45. In one embodiment, the gearbox 45 is disposed within the turbine section 90 along the radial direction R. In another embodiment, the gearbox 45 is disposed toward the downstream end 98 of the engine 10. For example, the gearbox 45 may be disposed toward the downstream end 98 of the turbine section 90. As another example, the gearbox 45 is disposed downstream of the turbine section 90 within an exhaust frame 150.

Referring to FIGS. 1 and 2, the engine 10 further includes a driveshaft 36 extended in the longitudinal direction L. The driveshaft 36 is connected to the output gear 49 of the gearbox 45. The rotor 113 of the first rotating component 110 is coupled to the driveshaft 36. As shown in FIG. 2, the gearbox 45 is coupled to the driveshaft 36 at the downstream end 98. The first rotating component 110 is coupled to the driveshaft 36 between the upstream end 99 and the downstream end 98 of the driveshaft 36.

In one embodiment, the driveshaft 36 defines a flexible coupling 37 attached to the gearbox 45 at the downstream end 98 of the engine 10. The flexible coupling 37 may be defined as extended substantially in the radial direction R from the axially extended portion of the driveshaft 36. In various embodiments, the flexible coupling 37 may define springing properties to absorb intermittent changes in power or torque from the gearbox 45 to the fan assembly 14, or from the fan assembly 14 to the gearbox 45. In one embodiment, the flexible coupling 37 further defines a shear-able material relative to the axially extended portion of the driveshaft 36 and/or the gearbox 45. For example, the flexible coupling 37 may define a portion of the driveshaft 36 designed to break, shear, or otherwise liberate the driveshaft 36 from the gearbox 45 at or above a critical load. The critical load may correspond to the load exerted by the fan assembly 14 onto the driveshaft 36 following a failure event (e.g. foreign object debris strike, fan blade-out, fan rotor failure, etc.). Alternatively, or additionally, the critical load may correspond to the load exerted by the gearbox 45 onto the driveshaft 36 following failure of gearbox 45 rotation. For example, the critical load may correspond to the load exerted from the first rotating component 110 to the driveshaft 36 when the gearbox 45 and/or second rotating component 120 fail to rotate. In various embodiments, failure of the second rotating component 120 and/or gearbox 45 to rotate may result in liberation of the driveshaft 36 from the gearbox 45 at the flexible coupling 37, thereby enabling rotation of the fan assembly 14 via the first rotating component 110 alone.

The engine 10 shown and described in regard to FIGS. 1 and 2 may define a torque path from first rotating component 110 to the driveshaft 36, and from the driveshaft 36 to the fan rotor 15 of the fan assembly 14. Still further, the engine 10 may define the torque path from the second rotating component 120 to the input shaft 121, and from the input shaft 121 to the gearbox 45, and from the gearbox 45 to the driveshaft 36 to the fan rotor 15.

In various embodiments, the first rotating component 110 rotates in a first direction 161 and the second rotating component 120 rotates in a second direction 162 opposite of the first direction 161. The first rotating component 110, and the output gear 49 of the gearbox 45 to which the first rotating component 110 via the driveshaft 36, rotates in the first direction 161 as the second rotating component 120, coupled to the input gear 47 of the gearbox 45 via the input shaft 121, rotates in the second direction 162. As such, in the embodiment shown in FIG. 2, the gearbox 45 is configured as a reversing reduction gearbox.

In various embodiments, the gearbox 45 defines a plurality of gears in which the input gear 47 and/or the input shaft 121 to which the input gear 47 attaches rotates at a speed greater than the output gear 49 or the driveshaft 36 receiving power from the gearbox 45. As such, the second rotating component 120 rotates at a speed greater than the first rotating component 110. Additionally, the second rotating component 120 rotates at a speed greater than the first rotating component 110 in a direction opposite of the first rotating component 110.

In various embodiments of the engine 10, the gearbox 45 defines a range of gear ratios of about −1.5:1 to about −3:1. For example, in one embodiment the gearbox 45 defines a reversing reduction gearbox in which the input gear 47 rotates approximately 1.5 times for each rotation of the output gear 49 in a direction opposite of the input gear 47.

In other embodiments, the gearbox 45 defines a range of gear ratios of about −1.8:1 to about −2.8:1. For example, in one embodiment the gearbox 45 defines a reversing reduction gearbox in which the input gear 47 rotates approximately 2.8 times for each rotation of the output gear 49 in a direction opposite of the input gear 47. It will be appreciated, however, that in still other exemplary embodiments, the gear ratio of the gearbox may be even greater, such as −3.5:1, −4:1, −4.5:1, etc. so as to, e.g., drive the fan assembly 14 at an even lower rotational speed.

Referring still to FIG. 2, the engine 10 may further include the exhaust frame 150 disposed aft or downstream 98 of the first and second rotating components 110, 120. The exhaust frame 150 defines one or more exhaust vanes 152 extended in the radial direction R. The exhaust frame 150 further defines a support structure 154 extended inward along the radial direction R. The support structure 154 generally defines an annular casing defining one or more fastening locations. The rear mounted gearbox 45 is statically coupled to the exhaust frame at the support structure 154.

In various embodiments, the exhaust frame 150 further includes a cap 156 covering or concealing the gearbox 45 within the exhaust frame 150 from external view and environmental conditions. The cap 156 may be removed to provide relatively quick access to the gearbox 45, the driveshaft 36, or other components of the engine 10 with rear mounted gearbox 45, in proximity to an unobstructed aft, outside portion of the engine 10, in contrast to a forward mounted gearbox configuration (e.g. within a fan assembly or LPC), in which the fan assembly is generally removed to access the gearbox.

Referring back to FIGS. 1 and 2, in various embodiments, the first and second rotating component 110, 120 together define a low pressure turbine (LPT) rotor. In such embodiments, the driveshaft 36 defines a low pressure (LP) shaft connected and rotatable with the fan rotor 15 of the fan assembly 14. The fan assembly 14 is driven collectively by the first rotating component 110 and the second rotating component 120. By arranging the engine 10 such that the first rotating component 110 is coupled directly to the driveshaft 36 that is coupled to the fan rotor 15, and by arranging the second rotating component 120 as coupled to the gearbox 45 that is coupled at the output gear 49 to the driveshaft 36, in one embodiment the first rotating component 110 transmits approximately 25% to about 75% of power or torque for rotation of the fan assembly 14. In another embodiment, the second rotating component 120 transmits approximately 30% to about 60% of power or torque for rotation of the fan assembly 14, in which the second rotating component 120 transmits power or torque through the gearbox 45 to the driveshaft 36 to the fan assembly 14. Additionally, interdigitating the first and second rotating components 110, 120 to define the LPT rotor results in efficiency and performance benefits due to relatively low flowpath velocities, reduced airfoil count (i.e. removed stationary vanes between rotating components), and/or reduced longitudinal dimensions of the LPT rotor relative to forward mounted reduction gearbox gas turbine engines (e.g. gearbox mounted at or within a fan assembly).

Figure 3:
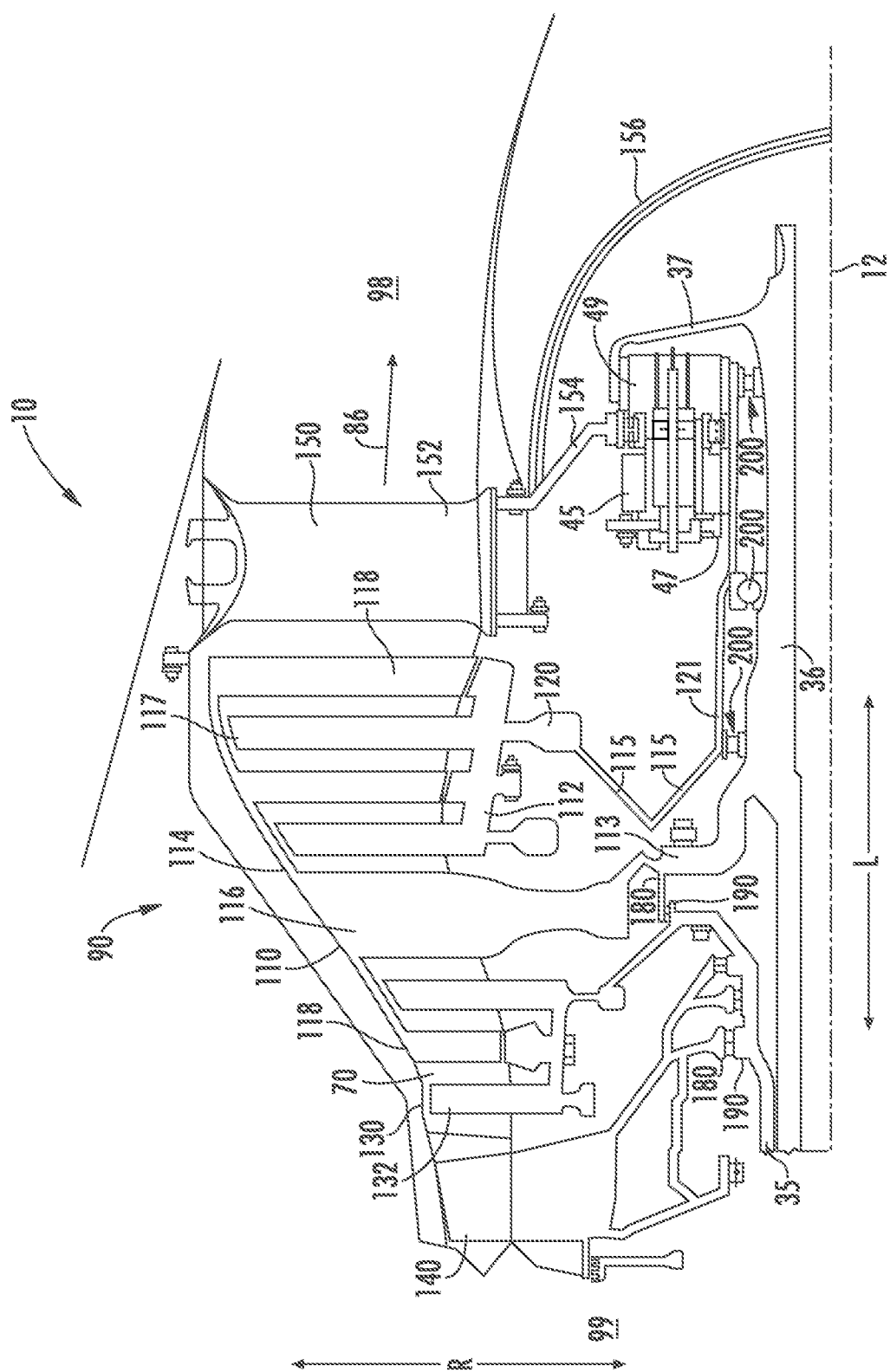
FIG. 3 is a schematic cross sectional view of another embodiment of the turbine section and reduction gearbox shown in FIG. 1.

Referring still to FIG. 3, the turbine section 90 further includes a third rotating component 130 disposed forward or upstream 99 of the one or more connecting airfoils 116 of the first rotating component 110. The third rotating component 130 includes a plurality of third airfoils 132 extended outward along the radial direction R. In one embodiment, the third rotating component 130 is disposed forward or upstream 99 of the first and second rotating component 110, 120. In various embodiments, the third rotating component 130 is disposed forward or upstream 99 along the longitudinal direction L of the connecting airfoils 116 of the first rotating component 110.

Figure 4:
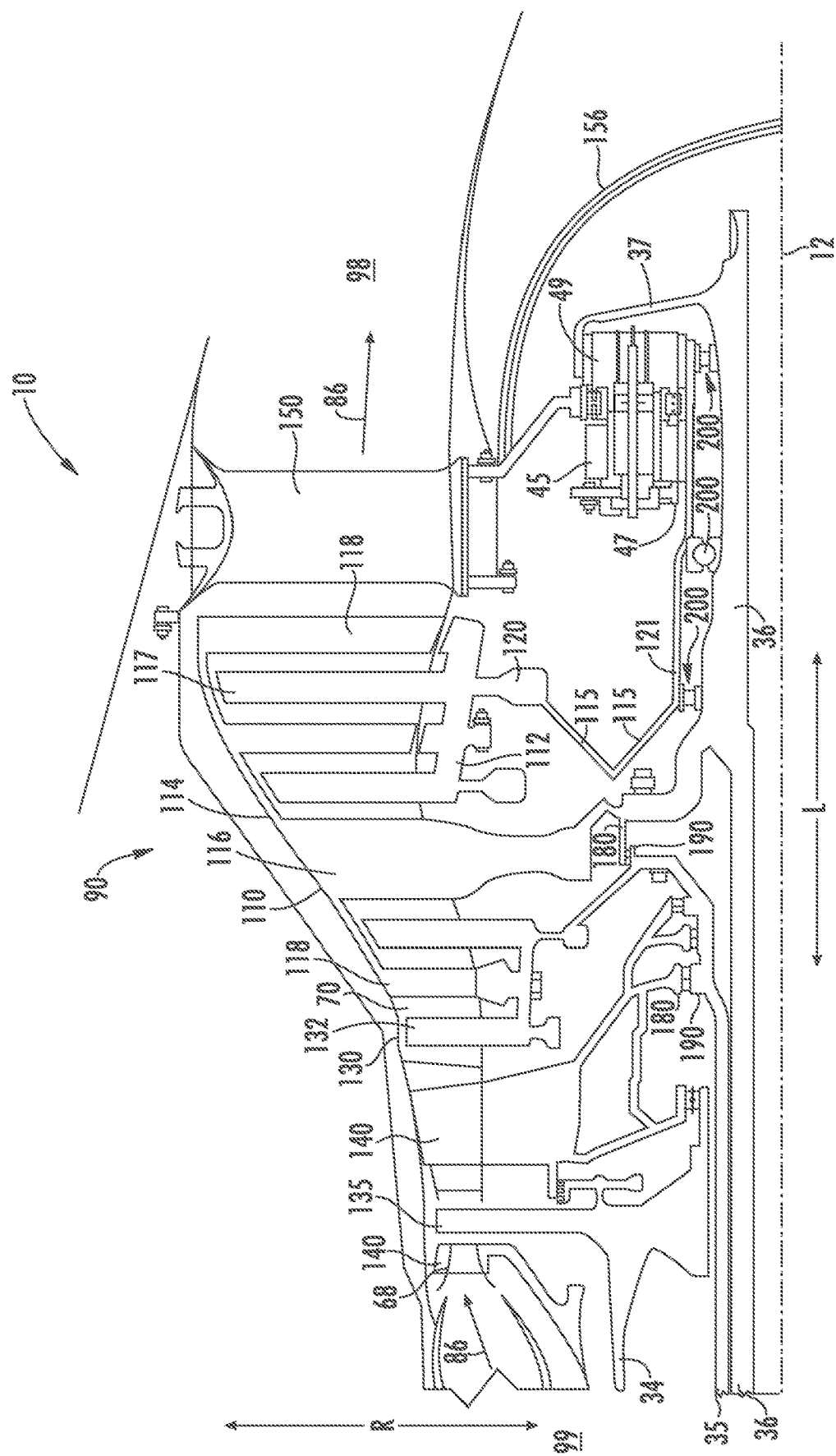
FIG. 4 is a schematic cross sectional view of yet another embodiment of the turbine section and reduction gearbox shown in FIG. 1.

Referring now to the exemplary embodiments of the turbine section 90 shown in FIGS. 3 and 4, the outer shroud 114 of the first rotating component 110 further extends forward or upstream 99 of the connecting airfoil 116 along the longitudinal direction L. The outer shroud 114 further includes the plurality of outer shroud airfoils 118 extended inward along the radial direction R and interdigitated among the third rotating component 130, such as the plurality of third rotating airfoils 132 extended outward along the radial direction R from the third rotating component 130.

Referring to the embodiment shown in FIG. 3, the turbine section 90 may define the third rotating component 130 as a single stage in which the outer shroud 114 of the first rotating component 110 extends forward or upstream 99 of the third rotating component 130. In such an embodiment, the turbine section 90 defines, in serial flow arrangement along the longitudinal direction L from upstream 99 to downstream 98, a first stage defining the first rotating component 110, a second stages defining the third rotating component 130, and a third stage defining the connecting airfoil 116 of the first rotating component 110. In various embodiments, the third rotating component 130 may define a high pressure turbine (HPT) rotor or an intermediate pressure turbine (IPT) rotor.

Referring to FIG. 3, the third rotating component 130 may define the HPT rotor of HPT assembly, in which the third rotating component 130 as the HPT rotor is drivingly connected and rotatable with a high pressure (HP) shaft 34. The HP shaft 34 is connected to the HPC 24, of which is driven in rotation by the third rotating component 130 of the turbine section 90.

In another embodiment, the third rotating component 130 may define the IPT rotor of the IPT assembly, in which the third rotating component 130, as the IPT rotor, is drivingly connected and rotatable with an intermediate pressure (IP) shaft 35. The IP shaft 35 is connected to the IPC 22, of which is driven in rotation by the third rotating component 130 of the turbine section 90.

In the embodiment shown in FIG. 4, the first rotating component 110 is interdigitated between two rotating stages of the third rotating component 130. As such, in the exemplary embodiment shown in FIG. 4, the turbine section 90 defines, in serial flow arrangement along the longitudinal direction L from upstream 99 to downstream 98, a first stage defining the third rotating component 130, a second stage defining the first rotating component 110, a third stage defining the third rotating component 130, and a fourth stage defining the connecting airfoil 116 of the first rotating component 110.

In the embodiment shown in FIG. 4, the engine 10 and turbine section 90 may further include a fourth rotating component 135 disposed forward or upstream 99 of the first, second, and third rotating components 110, 120, 130. In various embodiments, the fourth rotating component 135 may define the HPT rotor. Furthermore, the third rotating component 130 may define the IPT rotor.

Referring still to FIG. 4, the turbine section 90 may further include a turbine vane assembly 140 disposed forward or upstream 99 of the one or more connecting airfoils 116. The turbine vane assembly 140 may define a plurality of stationary airfoils (i.e. vanes) in circumferential arrangement. In one embodiment, the turbine vane assembly 140 is disposed forward or upstream 99 of the plurality of outer shroud airfoils 118 along the longitudinal direction L. For example, the turbine vane assembly 140 may define a first turbine vane or nozzle 68 toward the downstream end 98 of the combustion section 26. In other embodiments, the turbine vane assembly 140 is disposed between the fourth rotating component 135 and other rotating components, such as the first, second, or third rotating components 110, 120, 130. In still other embodiments, the turbine vane assembly 140 may be defined between the third rotating component 130 along the longitudinal direction L. For example, in lieu of the first rotating component 110 extended forward or upstream from the connecting airfoil 116, the turbine vane assembly 140 may be disposed between the two third rotating component 130 stages.

Referring to FIGS. 2-4, in various embodiments the third rotating component 130 may rotate in a direction opposite of the first rotating component 110 (i.e. counter rotating). For example, the first rotating component 110 may be configured to rotate in the first direction 161, and the second and third rotating components 120, 130 may be configured to rotate in the second direction 162 opposite of the first direction 161. In various embodiments, the fourth rotating component 135 may be configured to rotated in either the first direction 161 or in the second direction 162, either in co-rotation or in counter-rotation with the first rotating component 110.

The engine 10 and turbine section 90 shown and described herein may improve upon existing turbine sections by providing improved fuel efficiency, operational efficiency, and/or power output while maintaining or reducing weight, part count, and/or packaging. The plurality of outer shroud airfoils 118 of the first rotating component 110 interdigitated among the second and/or third rotating components 120, 130 may reduce packaging and reduce part count by removing stages of stationary airfoils between each rotating component. Additionally, the turbine section 90 may provide efficiency benefits comparable to a reduction gearbox without adding weight or size (e.g. axial length) to the engine 10. Furthermore, the turbine section 90 may improve engine 10 efficiency by reducing requirements for cooling air, generally extracted from the compressor section 21 and often considered to remove potential propulsive energy from the engine 10.

Referring now to the embodiments shown and described in regard to FIGS. 1-4, each stage of the turbine section 90 may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. For example, in one embodiment, at least a portion of the plurality of outer shroud airfoils 118 define a ceramic or CMC material.

The turbine section 90, or portions or combinations of portions thereof, including the inner shroud 112, the outer shroud 114, the connecting airfoil(s) 116, the plurality of outer shroud airfoils 118, and/or the plurality of inner shroud airfoils 119, may be formed using additive manufacturing or 3D printing, or casting, forging, machining, or castings formed of 3D printed molds, or combinations thereof. The turbine section 90, or portions thereof, such as stages of the rotors 110, 120, 130, 135 the outer shroud 114, the inner shroud 112, and other portions may be mechanically joined using fasteners, such as nuts, bolts, screws, pins, or rivets, or using joining methods, such as welding, bonding, friction or diffusion bonding, etc., or combinations of fasteners and/or joining methods.

The systems and methods shown in FIGS. 1-4 and described herein may decrease fuel consumption, increase operability, increase engine performance and/or power output while maintaining or reducing weight, part count, and/or packaging (e.g. radial and/or axial dimensions). The systems and methods provided herein may allow for increased high bypass ratios and/or overall pressure ratios over existing gas turbine engine configurations, such as turbofans, while maintaining or reducing packaging relative to other gas turbine engines of similar power output. The systems and methods described herein may improve bypass ratio and/or overall pressure ratio and thereby increase overall gas turbine engine efficiency. The systems provided herein may increase overall gas turbine engine efficiency by reducing or eliminating stationary airfoils that require cooling air (e.g. HPT or IPT vanes). Additionally, the systems provided herein may reduce gas turbine engine packaging and weight, thus increasing efficiency, by reducing rotating and/or stationary airfoil quantities (e.g. blades and/or vanes) by approximately 40% or more over gas turbine engines of similar power output.

The counter rotating turbine engine 10 with reversing reduction gearbox 45 generally defines a torque path from the first rotating component 110 to the driveshaft 36 to the fan rotor 15 of the fan assembly 14, and from the second rotating component 120 to the input shaft 121 to the gearbox 45, and from the gearbox 45 to the driveshaft 36 to the fan rotor 15. In various embodiments, the torque path is defined from the first rotating component 110 to the driveshaft 36 via the rotor 113 extended generally along the radial direction R. In still various embodiments, the torque path is defined from the second rotating component 120 to the input shaft 121 via the rotor 115 extended generally along the radial direction R. Therefore, the torque path defines from the low pressure turbine rotor a substantially parallel torque path from the low pressure turbine (collectively, the first and second rotating components 110, 120) to the fan assembly 14. In various embodiments, the low pressure turbine rotor may distribute approximately 50% torque from the low pressure turbine rotor, via the second rotating component 120, to the fan assembly 14 through the gearbox 45, while the remainder is distributed from the low pressure turbine rotor, via the first rotating component 110, to the fan assembly 14 directly through the driveshaft 36 to which the fan assembly 14 is coupled.

The engine 10 described and shown herein, in which approximately 50% power or torque transmits through the gearbox 45, may therefore define the gearbox 45 as smaller in contrast to known integral drive turbofan configurations in which substantially 100% of the LPT rotor power and torque is transmitted in series from the LPT rotor to the fan assembly, including one or more stages of fan or LPC rotors. Still further, as the gearbox 45 transmits less power or torque versus geared engine configurations of similar thrust output and/or size, bypass ratio, overall pressure ratio, or fan pressure ratio, the gearbox 45 is subject to less wear and stress, and may therefore reduce failure risks associated with geared turbofan configurations. Still furthermore, as the gearbox 45 transmits less power or torque, the reduction in gearbox 45 dimensions enables benefits of a geared engine configuration without increases in engine diameter.

Additionally, as the engine 10 defines an at least parallel torque path from the first rotating component 110 and the second rotating component 120 to the fan assembly 14, gearbox 45 failure modes are mitigated over known geared engine configurations. For example, events resulting in loss of gearbox 45 operation, such as, but not limited to, loss of oil flow or pressure to the gearbox 45, may result in the gearbox 45 and second rotating component 120 losing rotation (i.e. become static), thereby shearing or otherwise liberating the driveshaft 36 from the gearbox 45 and enabling at least a portion of power or torque to transmit to the fan assembly 14 from the first rotating component 110.

The counter rotating turbine with reversing reduction gearbox may generally provide to the engine benefits of a reduction gearbox, such as reduced fan rotor rotational speed, increased bypass ratio, reduced fan pressure ratio, decreased fan assembly noise, decreased fuel consumption, and/or increased engine efficiency, while further reducing or mitigating deleterious effects of reduction gearboxes, such as increased gearbox diameter and/or weight due to the magnitude of torque or power routed through the gearbox.

Additionally, the counter rotating turbine with reversing reduction gearbox may further increase engine efficiency and performance by providing a turbine and gearbox arrangement that permits a three-spool engine configuration in substantially the same axial length of a comparable two-spool geared configuration. Therefore, the counter rotating turbine with reversing reduction gearbox may further increase engine efficiency and performance by operating a low pressure turbine rotor at a more desirable operating speed, by operating a fan assembly at a more desirable operating speed, and operating a booster or intermediate pressure compressor at a speed substantially independent of the low pressure turbine rotor, such as non-proportionate of the low pressure turbine rotor.

Still further, the systems shown in FIGS. 1-4 and described herein may reduce a product of a flow area and the square of the rotational speed (the product herein referred to as "$AN^2$") of the gas turbine engine relative to a gas turbine engine incorporating a forward mounted gearbox (e.g. near or within the fan assembly). Generally, lowering the $AN^2$, such as by reducing the rotational speed and/or the flow area, increases the required average stage work factor (i.e. the average required loading on each stage of rotating airfoils). However, the systems and methods described herein may lower the $AN^2$ while also lowering the average stage work factor and maintaining axial length of the turbine section 90 (compared to engines of similar thrust output and packaging) by interdigitating the first rotating component 110 among the one or more stages of the second rotating component 120. Therefore, the first rotating component 110 may increase the quantity of rotating stages of airfoils while reducing the average stage work factor, and therefore the $AN^2$, while mitigating increases in axial length to produce a similar $AN^2$ value. The first rotating component 110 may further reduce the $AN^2$ while additionally reducing the overall quantity of airfoils, rotating and stationary, in the turbine section 90 relative to turbine sections of gas turbine engines of similar power output and/or packaging.

It will be appreciated, however, that in other exemplary embodiments of the present disclosure, the gas turbine engine 10 may have still other suitable configurations. For example, in other exemplary embodiments, the outer shroud 114 of the first rotating component 110 may instead be configured as an inner shroud, and the inner shroud 112 of the second rotating component 120 may instead be configured as an outer shroud (i.e., the inner and outer shrouds 112, 114 may be reversed). Further, although for the embodiments depicted in FIGS. 1 through 4 the gearbox 45 is located proximate the turbine section, in other embodiments, the gearbox 45 may instead be positioned at any other suitable location. Certain of these exemplary embodiments, as well as other exemplary embodiments, are described below.

Figure 5:
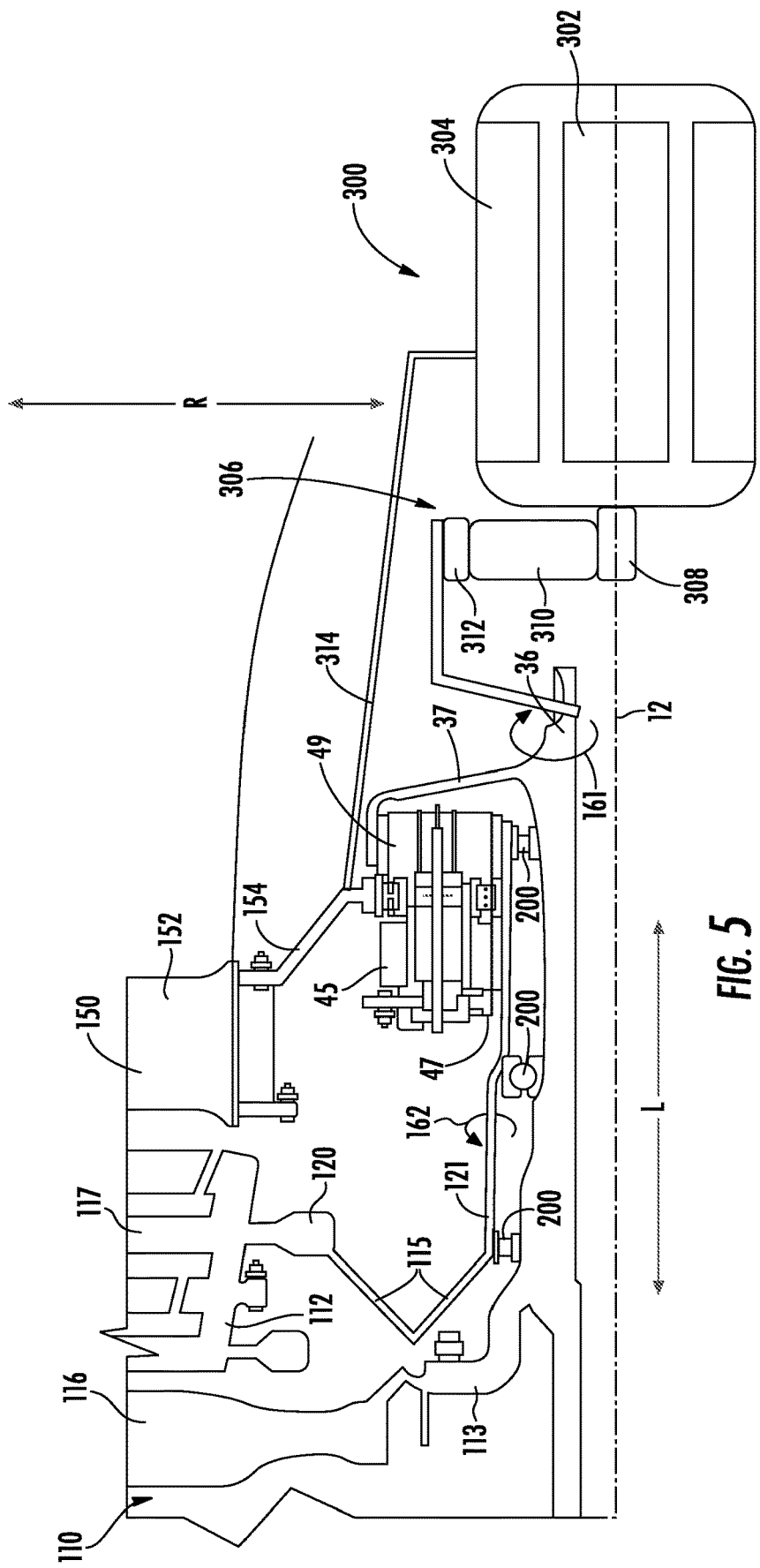
FIG. 5 is a schematic cross sectional view of a gas turbine engine including a reduction gearbox and an electric machine in accordance with an exemplary embodiment of the present disclosure.

Referring now to FIG. 5, a section of a gas turbine engine 10 in accordance with an exemplary embodiment of the present disclosure is depicted. The exemplary gas turbine engine 10 of FIG. 5 may be configured in substantially the same manner as the exemplary gas turbine engine 10 of FIG. 2. For example, the gas turbine engine 10 may generally include a turbine section having a first rotating component 110 and a second rotating component 120 arranged along a longitudinal direction L, as well as a first rotor 113. The first rotating component 110 may include a first shroud and a plurality of first shroud airfoils extending from the first shroud along a radial direction R and one or more connecting airfoils 116 coupling the first shroud to the first rotor 113. Further, the second rotating component 120 may similarly include a second shroud and a plurality of second shroud airfoils extending from the second shroud along the radial direction R. For the embodiment shown, the first shroud is an outer shroud 114 (see FIG. 2) and the first shroud airfoils are outer shroud airfoils 118. Further for the embodiment depicted, the second shroud is an inner shroud 112 and the second shroud airfoils are inner shroud airfoils 117.

Further for the embodiment shown, the gas turbine engine 10 includes a gearbox 45 and a driveshaft 36, the gearbox 45 including an input gear 47 and an output gear 49. The second rotating component 120 is coupled to the input gear 47 of the gearbox 45. More specifically, the turbine section of the gas turbine engine 10 further includes a second rotor 115 and a shaft 121. The second rotating component 120 is coupled to the input gear 47 of the gearbox 45 through the second rotor 115 and the shaft 121, which for the embodiment shown is an input shaft 121. Further, the driveshaft 36 is extended generally the longitudinal direction L and is connected to the output gear 49 of the gearbox 45. For the embodiment shown, the first rotor 113, which is coupled to the first rotating component 110, is further connected to the driveshaft 36.

Moreover, as will be appreciated, the first shroud airfoils of the first rotating component 110 are interdigitated with the second shroud airfoils of the second rotating component 120.

However, for the embodiment depicted, it will be appreciated that the gas turbine engine 10 is configured as a hybrid electric gas turbine engine including an electric machine 300. The electric machine 300 generally includes an EM rotor 302 and an EM stator 304. The EM rotor 302 is coupled to the first rotating component 110 or the second rotating component 120, such that the EM rotor 302 is rotatable with the first rotating component 110 or the second rotating component 120, respectively.

The electric machine 300 may be configured in any suitable manner for converting mechanical power to electrical power, or electrical power to mechanical power. For example, the electric machine 300 may be configured as an asynchronous or induction electric machine operable to generate or utilize alternating current (AC) electric power. Alternatively, the electric machine 300 may be configured as a synchronous electric machine operable to generate or utilize AC electric power or direct current (DC) electric power. In such a manner it will be appreciated that the EM stator 304, the EM rotor 302, or both may generally include one or more of a plurality of coils or windings arranged in any suitable number of phases, one or more permanent magnets, one or more electromagnets, etc.

Specifically for the embodiment of FIG. 5, the EM rotor 302 of the electric machine 300 is coupled to the first rotating component 110, and more specifically, the EM rotor 302 of the electric machine 300 is coupled to the first rotating component 110 through the driveshaft 36. In such a manner, and the power to be extracted from the turbine using the electric machine 300 may not be directed through the gearbox 45.

As will be appreciated from the description above, in certain exemplary embodiments, the first rotating component 110 may rotate slower than the second rotating component 120. In order to increase an efficiency of the electric machine 300, the gas turbine engine 10 further includes an EM gearbox 306. The EM rotor 302 of the electric machine 300 is coupled to the driveshaft 36 through the EM gearbox 306. For the embodiment shown, the EM gearbox 306 is configured as a planetary gear box having a sun gear 308, a plurality of planet gears 310, and a ring gear 312. However, in other embodiments, the EM gearbox 306 may be configured in any other suitable manner, and/or any other suitable speed change mechanism may be utilized (such as a hydraulic transmission, variable transmission or gearbox, two stage gearbox, etc.). In such a manner, the EM rotor 302 of the electric machine 300 may be designed to rotate at a desired rotational speed during certain operating conditions of the gas turbine engine 10 that is higher or lower than a rotational speed of the first rotating component 110.

Further for the embodiment of FIG. 5, the EM stator 304 is mounted to a stationary component of the gas turbine engine 10. Specifically, for the embodiment shown, the EM stator 304 includes an exhaust frame 152, and the EM stator 304 is coupled to the exhaust frame 152 through an EM mount 314 extending between the electric machine 300 and a support structure 154.

Inclusion of the electric machine 300 in accordance with an exemplary embodiment of FIG. 5 may allow for at least a certain amount of power from the turbine to be extracted during operation of the gas turbine engine 10 and converted into electrical power. Additionally, or alternatively, inclusion of the electric machine 300 in accordance with the exemplary embodiment of FIG. 5 may allow for the electric machine 300 to add mechanical power to the gas turbine engine 10, and more specifically, to add mechanical power to the driveshaft 36 of the gas turbine engine 10.

Figure 6:
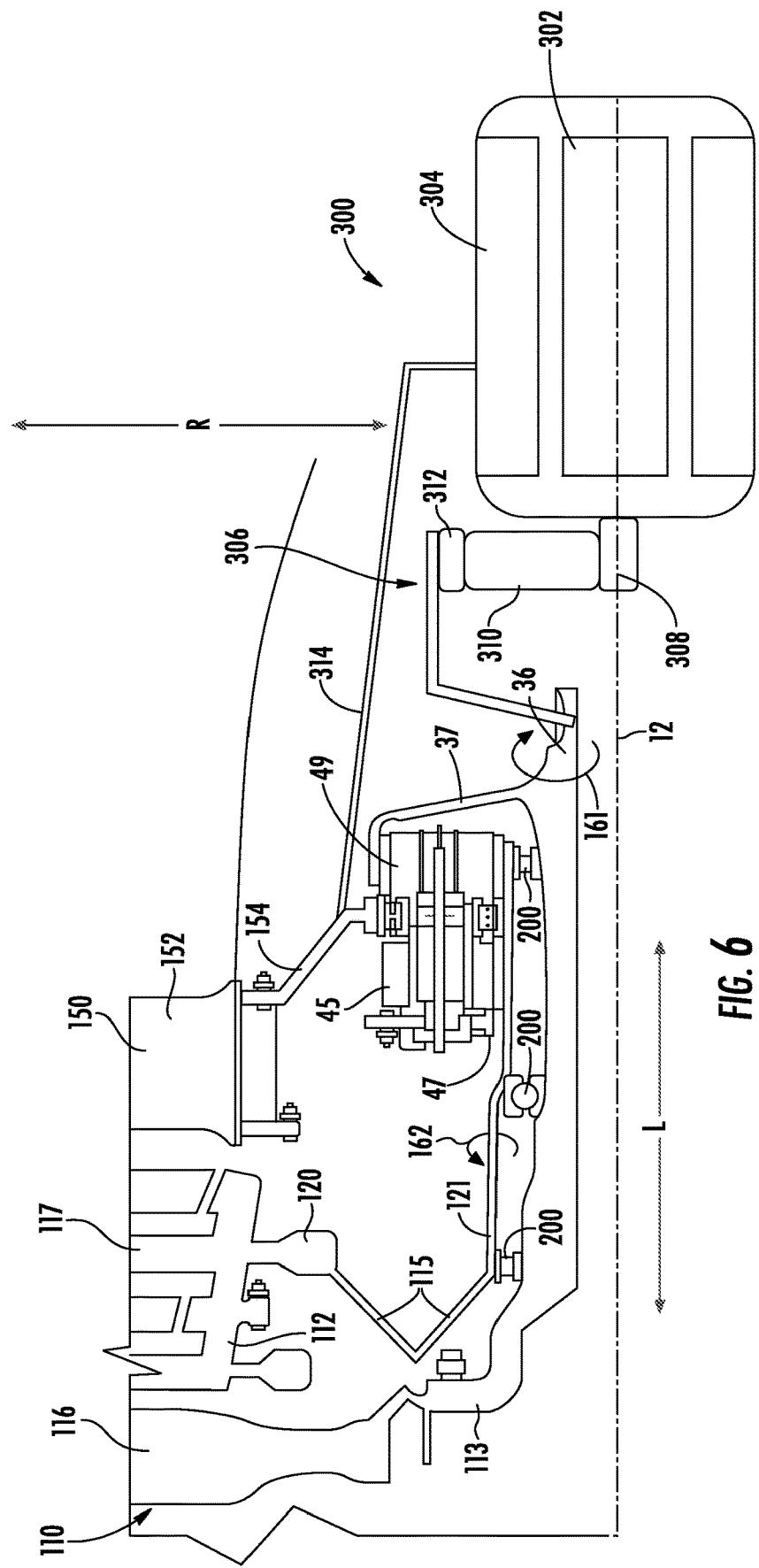
FIG. 6 is a schematic cross sectional view of a gas turbine engine including a reduction gearbox and an electric machine in accordance with another exemplary embodiment of the present disclosure.

It will be appreciated, however, that in other exemplary embodiments, the gas turbine engine 10 may have any other suitable configuration. For example, referring now to FIG. 6, a gas turbine engine 10 configured in substantially the same manner as the exemplary gas turbine engine 10 of FIG. 5 is depicted. As with the exemplary gas turbine engine 10 of FIG. 5, the exemplary gas turbine engine 10 of FIG. 6 includes an electric machine 300 having an EM rotor 302 coupled to the first rotating component 110 or the second rotating component 120. Further, although not depicted, it will be appreciated from the exemplary embodiments discussed above, such as the exemplary embodiment of FIG. 1, the gas turbine engine 10 may further include a fan assembly 14 having a stage 41 of fan blades 42. The first and second rotating components 110, 120 together form a turbine of the gas turbine engine 10, and more specifically, form a low pressure turbine of the gas turbine engine 10 for the embodiment shown. Inclusion of the exemplary electric machine 300 may facilitate having the turbine rotatably decoupled from the fan.

It will be appreciated, that as used herein, the term "rotatably decoupled" refers to two components that are not mechanically linked either directly or through one or more intermediate components, such as a gearbox, such that rotation of one component does not physically rotate the other component.

For example, for the embodiment shown, the electric machine 300 may be configured to receive mechanical power from the first rotating component 110 and the second rotating component 120 (through the gearbox 45) during operation of the gas turbine engine 10 and convert such mechanical power to electrical power. The electrical power may be provided through an electrical bus (not shown) having one or more electrical lines, power electronics, etc. to a separate electric machine mechanically coupled to the fan assembly 14. The separate electric machine 300 may then convert such electrical power received to mechanical power to drive the fan assembly 14. Additionally, or alternatively, the separate electric machine may be provided to any other suitable components of the gas turbine engine 10, such as to a low pressure or booster compressor, a high-pressure compressor, etc. Additionally, or alternatively, still, in other embodiments, the electrical power may be provided to any other suitable location.

It will be appreciated that in still other exemplary embodiments, gas turbine engines 10 having other suitable configurations may also be provided. For example, referring to FIGS. 7 and 8, the gas turbine engine 10 may include an electric machine 300 having multiple EM rotors.

Figure 7:
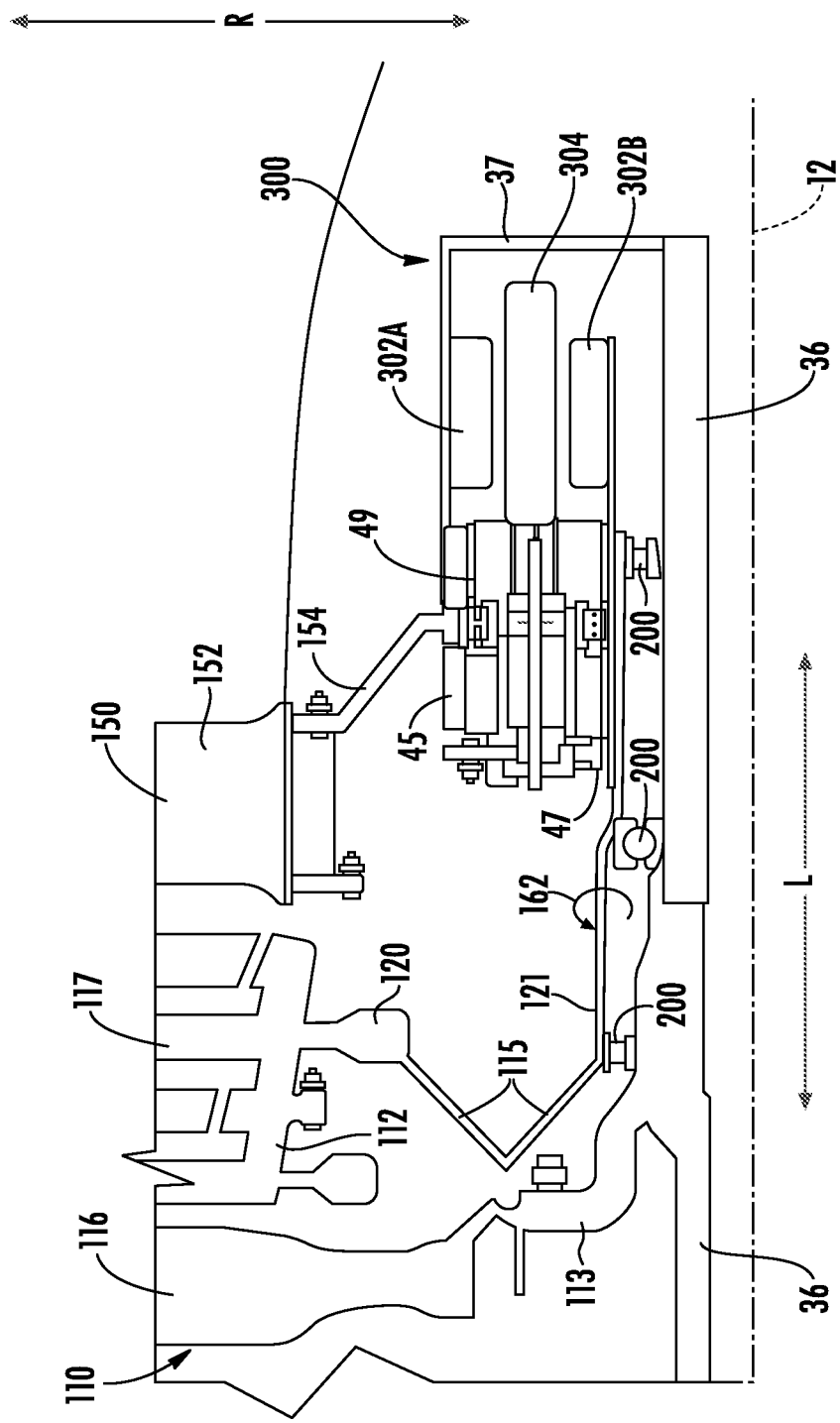
FIG. 7 is a schematic cross sectional view of a gas turbine engine including a reduction gearbox and an electric machine in accordance with yet another exemplary embodiment of the present disclosure.
Figure 8:
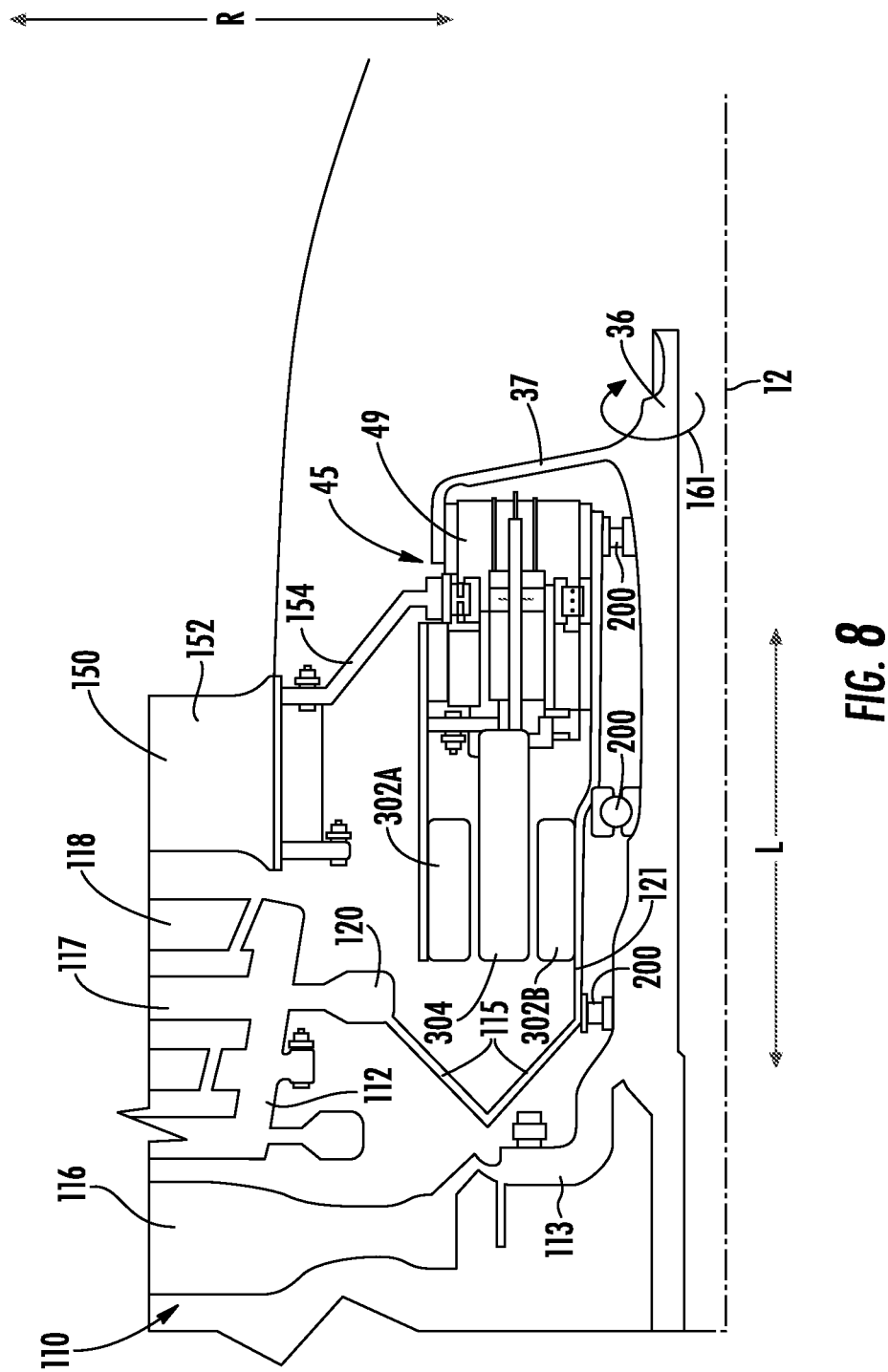
FIG. 8 is a schematic cross sectional view of a gas turbine engine including a reduction gearbox and an electric machine in accordance with still another exemplary embodiment of the present disclosure.

Referring specifically to FIG. 7, the electric machine 300 of the gas turbine engine 10 includes a first EM rotor 302A and a second EM rotor 302B, each operable with the EM stator 304. The first EM rotor 302A is directly rotatable with the output gear 49 of the gearbox 45 of the gas turbine engine 10 and with the driveshaft 36 of the gas turbine engine 10. The second EM rotor 302B is directly rotatable with the input gear 47 of the gearbox 45 and thus the second rotating component 120. Notably, the electric machine 300 further includes an EM stator 304 coupled to a stationary component of the gas turbine engine 10, and more particularly for the embodiment shown to a stationary component of the gearbox 45. For example, the EM stator 304 may be coupled to a planet gear carrier or casing 360 of the gearbox 45.

For the embodiment of FIG. 7, the first EM rotor 302A, the second EM rotor 302B, and the EM stator 304 are each positioned aft of the gearbox 45, with the first EM rotor 302A located outward of the EM stator 304 along the radial direction, and the second EM rotor 302B located inward of the EM stator 304 along the radial direction. Such may provide for increased ease of access for, e.g. maintenance, replacement, etc.

However, in other embodiments, certain aspects of the electric machine 300 may be positioned in other suitable configurations. For example, referring to FIG. 8, the first EM rotor 302A, the second EM rotor 302B, and the EM stator 304 of the electric machine 300 are instead positioned forward of the gearbox 45. Such a configuration may provide for, e.g., more desirable packaging of the electric machine 300 within the turbine section.

Inclusion of an electric machine 300 having a first EM rotor 302A directly rotatable with the first rotating component 110, and a second EM rotor 302B directly rotatable with the second rotating component 120 may provide for an electric machine 300 capable of extracting an increased amount of power from the turbine of the gas turbine engine 10.

Figure 9:
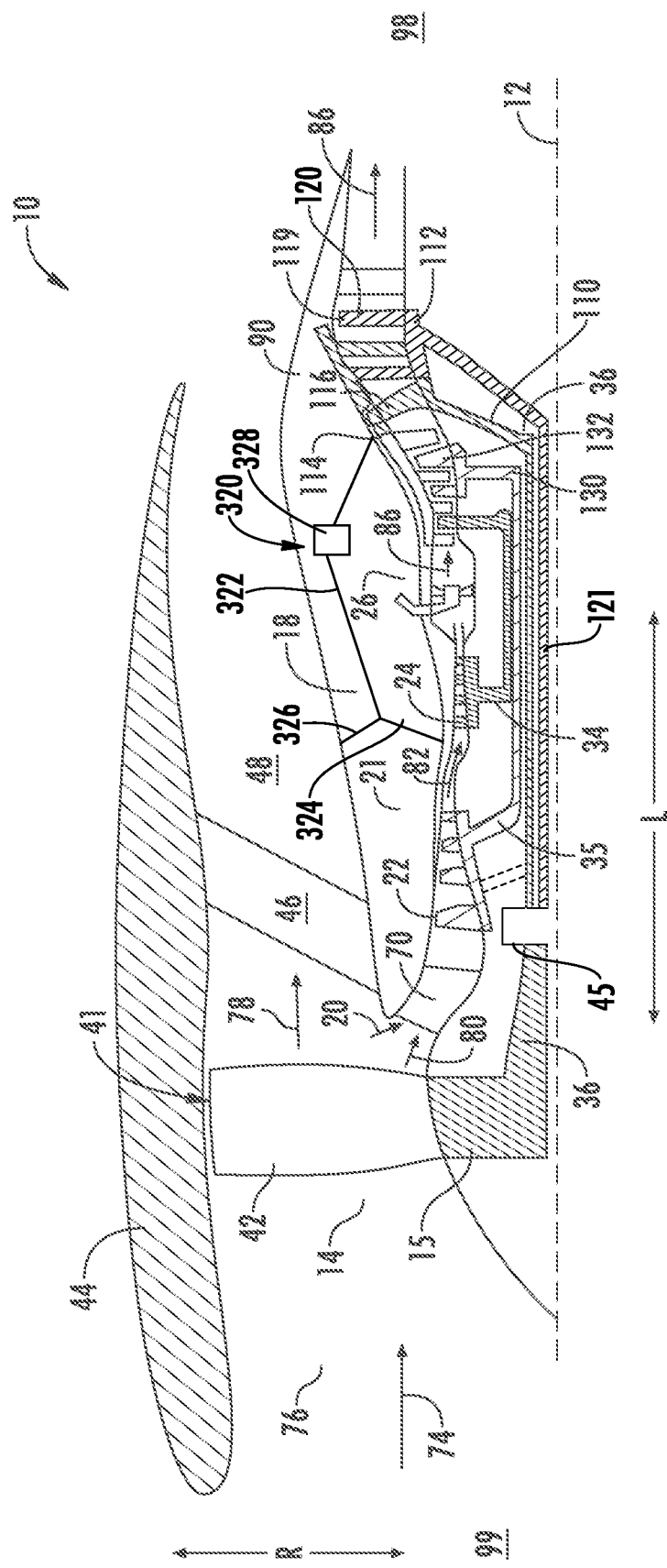
FIG. 9 is a schematic cross sectional view of an exemplary gas turbine engine incorporating a turbine section and reduction gearbox in accordance with an exemplary embodiment of the present disclosure.

Referring now to FIG. 9, a gas turbine engine 10 in accordance with another exemplary embodiment of the present disclosure is provided. The exemplary gas turbine engine 10 of FIG. 9 may be configured in substantially the same manner as exemplary gas turbine engines 10 described above with reference to FIG. 1. For example, the exemplary gas turbine engine 10 of FIG. 9 generally defines a longitudinal or centerline axis 12, and includes a fan assembly 14 and a turbomachine. The turbomachine generally includes a compressor section having a first compressor 22 and a second compressor 24, a combustion section 26, and a turbine section having a first turbine, a second turbine, and a third turbine, as will be explained in more detail below.

Briefly, it will be appreciated that the turbine section includes a first rotating component 110 and a second rotating component 120. The first and second rotating components 110, 120 include respective airfoils interdigitated and counterrotating with one another. The first rotating component 110 is coupled to a first shaft/driveshaft 36 and the second rotating component 120 is coupled to a second shaft 121. The gas turbine engine 10 further includes a reversing gearbox 45 similar to the exemplary gearbox 45 described above with reference to, e.g., FIGS. 1 and 2. However, for the embodiment shown, the reversing gearbox 45 is not positioned proximate the turbine section, and instead is positioned forward of the combustion section 26. In particular, for the embodiment shown, the reversing gearbox 45 is aligned with, or positioned forward of, the first compressor 22 along the longitudinal direction L. In such a manner, the first and second shafts 36, 121 extend from the turbine section forward to the reversing gearbox 45 within the compressor section. As such, it will be appreciated that in at least certain exemplary embodiments, one or both of the first and second shafts 36, 121 may additionally delivery power to other components of the gas turbine engine 10 located, e.g., within the compressor section, such as the first compressor 22. For example, in certain exemplary embodiments, as is depicted schematically in phantom, the driveshaft 36 may define a torque path between the first rotating component 110 and the gearbox 45 and the driveshaft 36 is further coupled to the compressor 22 at a location along the torque path between the first rotating component 110 and the gearbox 45.

It will be appreciated, however, that the gearbox 45 placement in FIG. 9 is by way of example only, and in other exemplary embodiments, the gearbox 45 may alternatively be positioned at any suitable location.

The gas turbine engine 10 further includes an outer nacelle 44 defining a bypass airflow passage 48 with an outer casing 360 of the turbomachine.

As will be appreciated, during operation of the gas turbine engine 10, certain components may be exposed relatively high temperatures causing, e.g., thermal expansion. The thermal expansion may make it difficult to maintain a desired tip clearance between the various rotating airfoils within the turbine section and the respective radially-adjacent components.

Accordingly, the exemplary gas turbine engine 10 of FIG. 9 further includes an active clearance control system 320. The active clearance control system 320 generally includes a cooling air duct 322 in airflow communication with a cooling air source. Specifically, for the embodiment shown, the cooling air duct 322 includes a first section 324 in airflow communication with the compressor section for receiving a flow of compressed cooling airflow from the compressor section, as well as a second section 326 in airflow communication with the bypass airflow passage 48 for receiving a flow of cooling airflow from the bypass airflow passage 48.

Further, for the embodiment shown, the active clearance control system 320 further includes an accessory system 328 for facilitating providing the cooling airflow from the cooling air duct 322 to or more components within the turbine section. Specifically, the accessory system 328 may include, e.g., an airflow pump or compressor, a heat exchanger for removing heat from the cooling airflow from or through the cooling air duct 322, etc.

Figure 10:
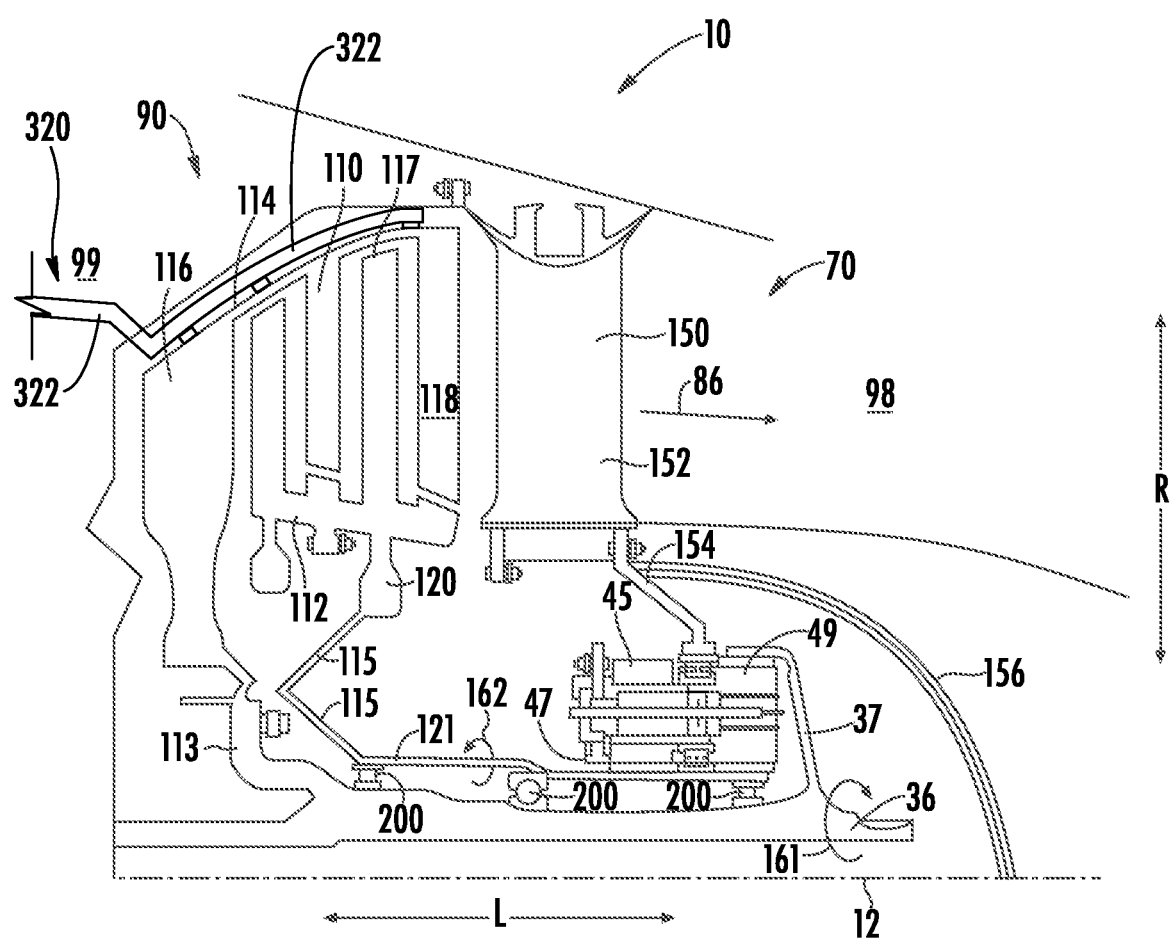
FIG. 10 is a close-up, schematic, cross sectional view of the turbine section of the exemplary gas turbine engine of FIG. 9.

Referring now to FIG. 10, a close-up view of a section of the active clearance control system 320 and gas turbine engine 10 of FIG. 9 is provided. For the embodiment shown, the first rotating component 110 includes an outer shroud 114 and a plurality of outer shroud airfoils 118 extending inwardly from the outer shroud 114 along the radial direction R. Additionally, the second rotating component 120 includes an inner shroud 112 the plurality of inner shroud airfoils 117 extending outwardly from the inner shroud 112 along the radial direction R. Each of the plurality of inner shroud airfoils 117 defines a tip clearance 330 (see FIG. 11) with the outer shroud 114. The active clearance control system 320 is configured to maintain a temperature of the outer shroud 114 in such a manner to prevent the outer shroud 114 from expanding more than a desired amount during operation as a result of, e.g., thermal expansion, relative to the inner shroud airfoils 117 so as to maintain a desired tip clearance 330.

Figure 11:
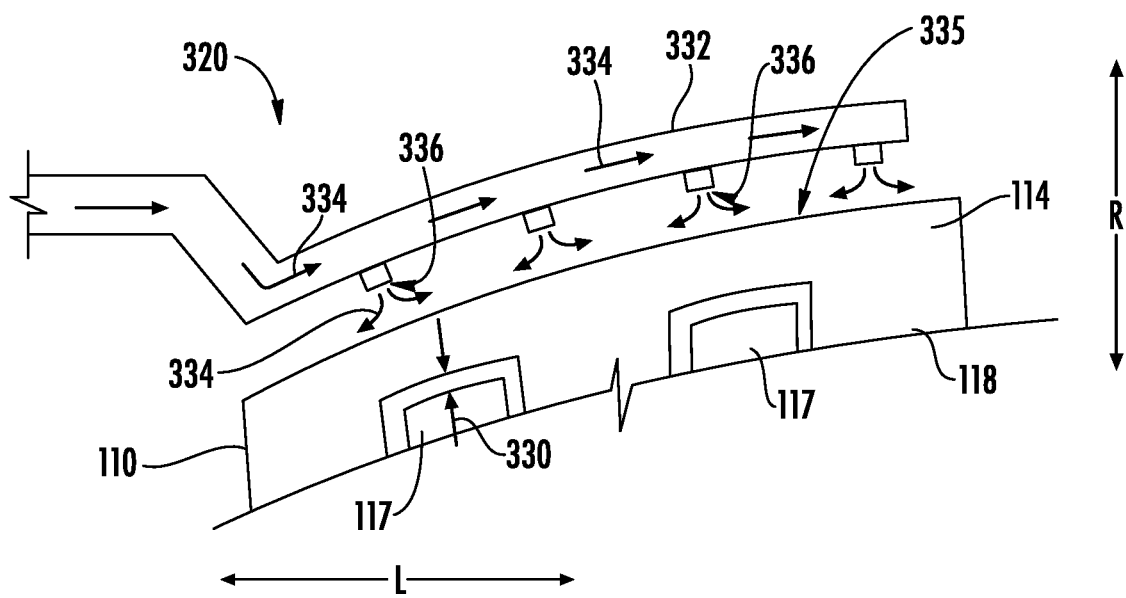
FIG. 11 is a close-up, schematic, cross sectional view of an active clearance control system of the exemplary gas turbine engine of FIG. 9.

Specifically, for the exemplary embodiment depicted, referring also to FIG. 11, it will be appreciated that the active clearance control system 320 further includes a cooling air manifold 332. The cooling air manifold 332 is configured to receive the cooling airflow, indicated by arrow 334, from the cooling air duct 322 and provide the cooling airflow onto an outer surface 335 of the outer shroud 114. In particular, for the embodiment depicted, the cooling air manifold 332 is coupled to the cooling air duct 322 for receiving the cooling airflow.

Further, referring particularly to FIG. 11, the cooling air manifold 332 extends generally along the longitudinal direction L and defines a plurality of cooling air outlets 336 spaced along the longitudinal direction L. For the embodiment shown, the cooling air manifold 332 includes four cooling air outlets 336, however, in other embodiments, the cooling air manifold 332 may include any other suitable number of cooling air outlets 336. In such a manner, the active clearance control system 320 may maintain a temperature of the outer shroud 114 within a desired temperature range to accordingly maintain the tip clearance 330 between the plurality of inner shroud airfoils 117 and the outer shroud 114.

Figure 12:
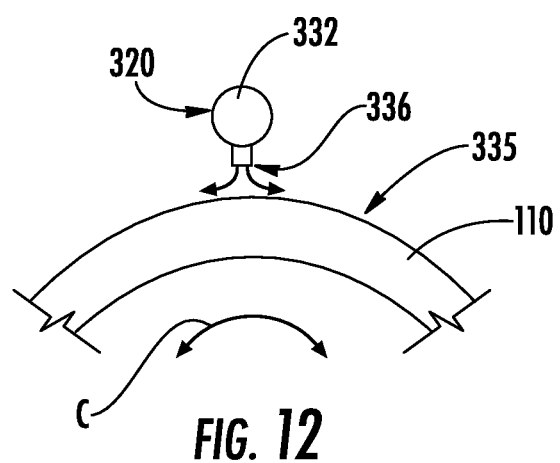
FIG. 12 is a close-up, schematic, cross sectional view of the active clearance control system of FIG. 11, as viewed along a longitudinal direction.

Notably, it will be appreciated that for the embodiment shown, the outer shroud 114 is configured to rotate in a circumferential direction C during operation (i.e., a direction extending about the longitudinal direction L, see FIG. 12). As such, the cooling air manifold 332 may extend less than completely around the outer shroud 114 along the circumferential direction C, while still providing cooling airflow to substantially an entirety of a circumference of the outer shroud 114.

For example, referring briefly to FIG. 12, providing a cross-sectional view along the circumferential direction C, it will be appreciated that in at least certain exemplary embodiments, the cooling air manifold 332 of the active clearance control system 320 may be configured/positioned to provide cooling airflow to less than half of a circumferential portion of the outer shroud 114, such as less than twenty-five percent of a circumferential portion of the outer shroud 114. More specifically, for the embodiment of FIG. 12, the cooling air manifold 332 is the only cooling air manifold 332 arranged in the circumferential direction C about the outer shroud 114. Notably, it will further be appreciated that for the embodiment shown, the cooling air manifold 332 is configured as a single duct extending generally along the longitudinal direction L.

Notably, however, in other embodiments, the gas turbine engine 10 may include any other suitable active clearance control system 320 for maintaining a tip clearance 330 of one or more airfoils within the turbine section within a desired range. Additionally, or alternatively, the gas turbine engine 10 may not include an active clearance control system, and instead may utilize passive measures. Further, although the active clearance control system 320 depicted in these figures is only directly operable with the outer surface 335 of the outer shroud 114, in other embodiments, the clearance control system may further be directly operable with additional components or aspects of the turbine.

Figure 13:
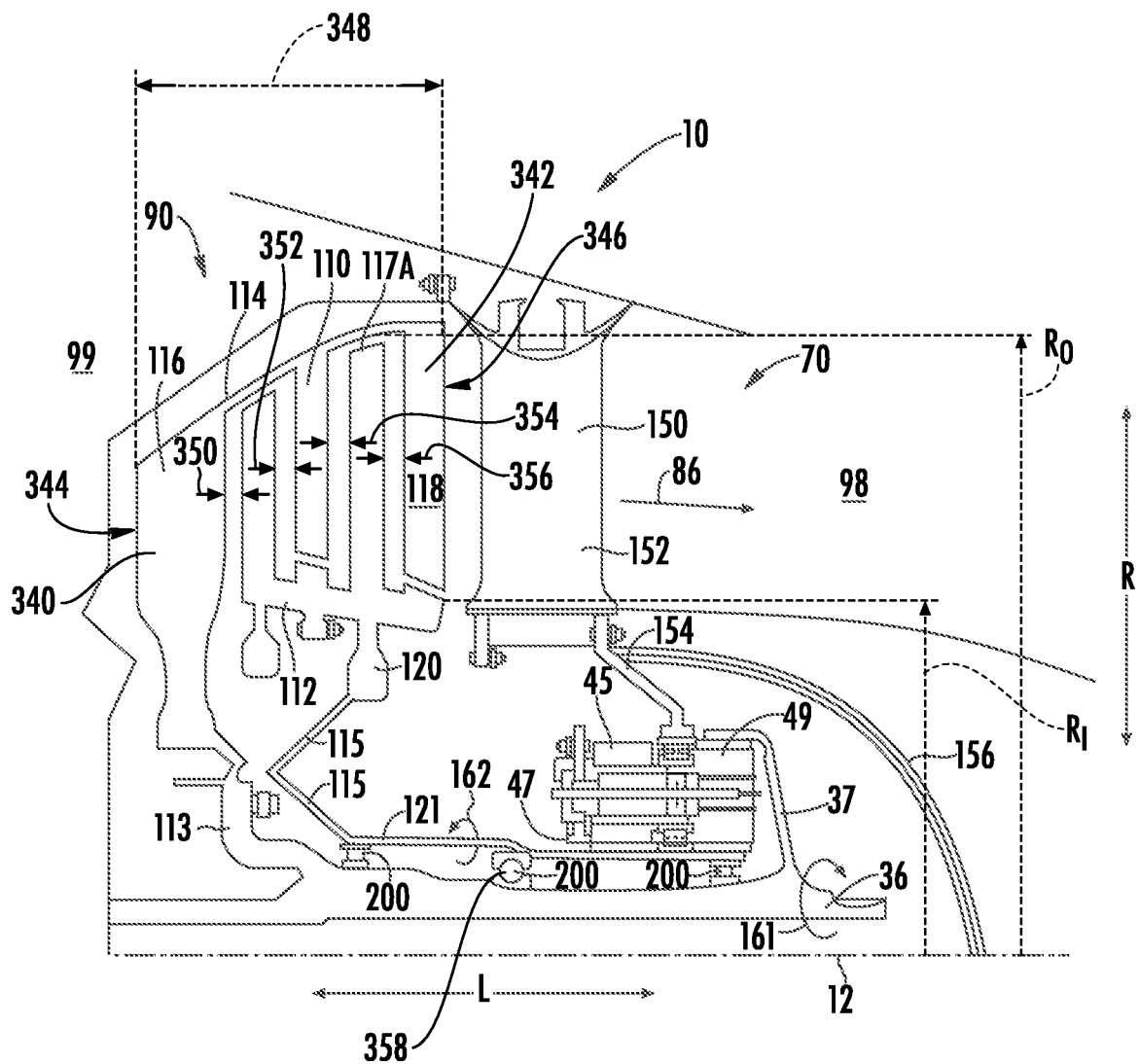
FIG. 13 is a schematic cross sectional view of an exemplary turbine section of a gas turbine engine and reduction gearbox in accordance with an exemplary embodiment of the present disclosure.

Referring now to FIG. 13, certain exemplary aspects of a gas turbine engine 10 in accordance with another embodiment of the present disclosure are depicted and described. Specifically, FIG. 13 depicts a section of a gas turbine engine 10 including a turbine. The exemplary gas turbine engine 10 depicted in FIG. 13 may be configured in substantially the same manner as the exemplary gas turbine engine 10 depicted in FIG. 2.

For example, the gas turbine engine 10 may generally include a turbine section having a first rotating component 110 and a second rotating component 120 arranged along the longitudinal direction L, as well as a first rotor 113. The first rotating component 110 may include a first shroud and a plurality of first shroud airfoils extending from the first shroud along the radial direction R and one or more connecting airfoils 116 coupling the first shroud to the first rotor 113. Further, the second rotating component 120 may similarly include a second shroud and a plurality of second shroud airfoils extending from the second shroud along the radial direction R. For the embodiment shown, the first shroud is an outer shroud 114 and the first shroud airfoils are outer shroud airfoils 118. Further for the embodiment depicted, the second shroud is an inner shroud 112 and the second shroud airfoils are inner shroud airfoils 117.

Further for the embodiment shown, the gas turbine engine 10 includes a gearbox 45 and a driveshaft 36, with the gearbox 45 including an input gear 47 and an output gear 49. The second rotating component 120 is coupled to the input gear 47 of the gearbox 45, and more specifically, is coupled to the input gear 47 of the gearbox 45 through a shaft or spool 121. Further, the driveshaft 36 is extended generally the longitudinal direction L and is connected to the output gear 49 of the gearbox 45. For the embodiment shown, the first rotor 113, which is coupled to the first rotating component 110, is further connected to the driveshaft 36.

Moreover, as will be appreciated, the first shroud airfoils of the first rotating component 110 are interdigitated with the second shroud airfoils of the second rotating component 120.

Further, it will be appreciated that for the exemplary embodiment depicted, the first and second rotating components 110, 120 together form a turbine having a plurality of rotating airfoils (i.e., the first shroud airfoils and the second shroud airfoils, or rather the outer shroud airfoils 118, connection airfoil(s) 116, and inner shroud airfoils 117). The plurality of rotating airfoils includes a forward-most rotating airfoil 340 and an aft-most rotating airfoil 342. For the embodiment shown, the forward-most rotating airfoil 340 is the connecting airfoil 116 of the first rotating component 110 and the aft-most rotating airfoil 342 is one of the plurality of first shroud airfoils of the first rotating component 110. Further, for the embodiment shown, the forward-most rotating airfoil 340 defines a leading edge 344 and the aft-most rotating airfoil 342 defines a trailing edge 346. The turbine defines an axial length 348 from the leading edge 344 of the forward-most rotating airfoil 340 to the trailing edge 346 of the aft-most rotating airfoil 342. For the embodiment shown, the axial length 348 is more specifically, a length along the axial/longitudinal direction L between a forward-most point of the leading edge 344 of the forward-most rotating airfoil 340 to an aft-most point of the trailing edge 346 of the aft-most rotating airfoil 342.

Further, for the embodiment shown, the turbine defines a total axial separation defined between each axially-adjacent pair of rotating airfoils of the plurality of rotating airfoils of the turbine (which again, for the embodiment shown, includes the first shroud airfoils and the second shroud airfoils, or rather the outer shroud airfoils 118, the connection airfoil(s) 116, and inner shroud airfoils 117). Specifically, for the embodiment shown, the total axial separation is the sum of a first axial separation 350 defined between a first and a second rotating airfoil of the plurality of rotating airfoils, a second axial separation 352 defined between the second and a third rotating airfoil of the plurality of rotating airfoils, a third axial separation 354 defined between the third and a fourth rotating airfoil of the plurality rotating airfoil, and a fourth axial separation 356 defined between the fourth rotating airfoil and a fifth rotating airfoil. It will be appreciated, that as used herein, the term "axial separation" with reference to an axially-adjacent pair of rotating airfoils refers to an average axial length between adjacent leading and trailing edges of the axially-adjacent pair of rotating airfoils (i.e., average along the span). More specifically, the average axial length between adjacent leading and trailing edges of the axially-adjacent pair of rotating airfoils refers to the average of the gaps/axial separation taken from a maximum axial separation (e.g., at a tip) to a minimum axial separation (e.g., at a root).

For the exemplary gas turbine engine 10 depicted, and more specifically, for the exemplary turbine of the exemplary gas turbine engine 10 depicted, the plurality of rotating airfoils are positioned such that the total axial separation is relatively small as compared to the axial length 348 of the turbine. Specifically, for the exemplary embodiment depicted, the total axial separation is less than about thirty percent (30%) of the axial length 348 of the turbine, such as less than about twenty-five percent (25%) of the axial length 348 of the turbine, such as less than about twenty percent (20%) of the axial length 348 of the turbine. In at least certain exemplary aspects, the total axial separation may be at least about five percent (5%) of the axial length 348 of the turbine.

By way of example only, in at least one exemplary embodiment, the axial length 348 may be about fifteen (15) inches and, as shown, the turbine may include five (5) stages, or five rows of rotating airfoils. An average axial separation between axially-adjacent rotating airfoils in the turbine may be less than or equal to about 0.75 inches.

However, in other exemplary embodiments the turbine may include any other suitable number of stages to fit a particular design goal. For example, in other exemplary embodiments, the turbine may define an axial length 348 of ten (10) inches and include four (4) stages of rotating airfoils. With such configurations, an average axial separation between axially-adjacent rotating airfoils in the turbine may be less than or equal to about 0.67 inches. In still other exemplary embodiments, the turbine may be longer, defining an axial length 348 of twenty (20) inches and including ten (10) stages of rotating airfoils. With such a configuration, an average axial separation between axially-adjacent rotating airfoils in the turbine may be less than or equal to about 0.69 inches. Note that with each of the above examples, the total axial separation is equal to about twenty percent (20%) of the axial length 348 of the turbine.

In one or more embodiments, the average axial separation between axially-adjacent rotating airfoils in the turbine may be within a predetermined range of the values described, such as within 5% of the value, within 10% of the value, or within 20% of the value. As such, in other exemplary embodiments, such as when the axial length 348 is 15 inches and the turbine includes five stages, the average axial separation between axially-adjacent rotating airfoils in the turbine may be within 5% of 0.75 inches, within 10% of 0.75 inches, or within 20% of 0.75 inches. Additionally or alternatively, the average axial separation between axially-adjacent rotating airfoils in the turbine may be within 2 or 3 standard deviations from the number representing a mean value.

It will further be appreciated that as used herein, as noted above, the term "average axial separation" refers to the total axial separation, divided by the number of gaps between adjacent rotating airfoils (e.g., if there are 5 airfoils then there are 4 gaps and the total axial separation is divided by 4 to determine the average axial separation).

The examples of average axial separation sizes mentioned above reflect a balance between achieving desired aerodynamic performance from the interdigitated airfoils while accounting for thermal and mechanical effects associated with the operating environment and relative rotation rates. From an aerodynamic viewpoint, it is generally desirable to have the airfoils more closely spaced to achieve an increased efficiency in converting a kinetic energy in a moving airmass to mechanical power. However, axial separations cannot be too small due to mechanical vibrations, which can produce relative axial movement between airfoils, and thermal expansion of the blades and shrouds. Both or either of which can cause the adjacent airfoils to collide with each other if they are spaced too closely. Thus, to avoid collisions between airfoils the axial separation must be sufficiently large. With these competing design objectives in mind, the inventors have discovered a range of axial separation sizes that reflect an acceptable balance between aerodynamic performance needs and collision avoidance (and related mechanical reliability concerns), as may be enabled by the configuration of the present disclosure. The relationships in Equation 1 provides a range of values for the average axial separation (dx) within the turbine for a given axial length 348 (L) of the turbine, having N number of stages:

$$0.05L/(N-1) < dx < 0.4L/(N-1).$$  Equation 1:

Thus, in Equation 1, the average axial separation, dx, may lie between 0.05 L/(N−1) and 0.4 L/(N−1).

However in other embodiments, the range of values for the average axial separation (dx) within the turbine for a given axial length 348 (L) of the turbine, having N number of stages may instead be related using one or both of Equations 2 or 3, as follows:

$$0.1L/(N-1) < dx < 0.3L/(N-1). \quad \text{Equation 2:}$$

$$0.15L/(N-1) < dx < 0.25L/(N-1). \quad \text{Equation 3:}$$

The axial length of the turbine may be, for example, 10 inches, 13 inches or 20 inches depending on engine requirements. For each axial length the number of stages may vary accordingly. For example, for the 10-inch axial length there may be 4 stages, for the 13-inch axial length there may be 6 stages, and for the 20-inch axial length there may be 10 stages. In general, the number of stages may vary between 3 and 10 (FIG. 2 shows 5 stages). TABLE 1 shows average axial separation size ranges using each of Equations 1-3.

TABLE 1

| Length L (in) and no. stages (N) | AVERAGE AXIAL SEPARATION RANGES (in) | | |
| --- | --- | --- | --- |
| | EQ. 1 | EQ. 2 | EQ. 3 |
| L = 10, N = 4 | 0.17-1.33 | 0.33-1.0 | 0.5-0.83 |
| L = 13, N = 6 | 0.13-1.04 | 0.26-0.78 | 0.39-0.65 |
| L = 20, N = 10 | 0.11-0.89 | 0.22-0.67 | 0.33-0.56 |

In a specific example of an assembled turbine having 6 stages, the average axial separation across the 5 gaps was 0.5 inches with the individual axial separation sizes ranging between 0.4 inches and 0.6 inches. This compares well with the approximate ranges given in TABLE 1.

Such a configuration may be enabled at least in part through the inclusion of a thrust bearing 358 supporting the first rotating component 110 and the second rotating component 120 proximate the turbine section. Inclusion of the thrust bearing 358 proximate the turbine section may ensure that a relative thermal expansion along the longitudinal direction L is minimal between the first and second rotating components 110, 120. By contrast, if the thrust bearing 358 between the first and second rotating components 110, 120 were positioned, e.g., forward of the combustion section 26, then any thermal expansion of the driveshaft 36 would result in a relatively large displacement of the first rotating component 110 relative to the second rotating component 120, thereby increasing the total axial separation of the plurality of rotating airfoils within the turbine that would be necessary to avoid clashing during operations of the gas turbine engine 10.

For the embodiment shown, the thrust bearing 358 is configured as a ball bearing. However, in other embodiments, the thrust bearing 358 may be configured in any other suitable manner. For example, in other embodiments, the thrust bearing 358 may be a pair of tapered roller bearings, an air thrust bearing, etc.

Referring still to FIG. 13, and as noted earlier, for the exemplary gas turbine engine 10 depicted the first shroud airfoils of the first rotating component 110 are interdigitated with the second shroud airfoils of the second rotating component 120 to reduce a product of an exit annulus area of the turbine section and the square of a rated rotational speed of the first rotational component, the product herein referred to as "$AN^2$". $AN^2$ is a well-known indicator of the airfoil stress due to centrifugal loads during operation of the gas turbine engine.

Generally, lowering the $AN^2$, such as by reducing the rotational speed and/or the flow area, increases a required average stage work factor (i.e., the average required loading on each stage of rotating airfoils). However, the systems and methods described herein may lower the $AN^2$ while also lowering the average stage work factor and maintaining or reducing an axial length of the turbine section 90 (compared to engines of similar thrust output and packaging) by inter-digitating the first rotating component 110 among the one or more stages of the second rotating component 120.

Particularly for the exemplary embodiment depicted, and for the discussion herein, we are referring to the maximum $AN^2$ for the turbine depicted. As such, the exit annulus area is defined at the aft-most high speed airfoil of the plurality of rotating airfoils, which for the embodiment shown is the aft-most rotating airfoil of the second plurality of airfoils (noted 117A in FIG. 13) of the turbine. Such is due to the fact that in the embodiment shown, the second rotating component 120 rotates at a higher rotational speed than the first rotating component 110, such that the $AN^2$ value is higher when calculated based on this rotational value. The exit annulus area may be calculated using the equation: $\pi \times (R_O^2 - R_I^2)$, where $R_O$ is the outer radius of the blade exit at the aft-most high speed and $R_I$ is the inner radius of the exit at the aft-most high speed airfoil. More specifically, $R_O$ is the outer radius of the blade exit at the aft-most rotating airfoil 117A of the second plurality of airfoils and $R_I$ is the inner radius of the exit airflow passage at the aft-most airfoil 117A of the second plurality of airfoils. Further, the rated rotational speed refers to a rotational speed of the aft-most airfoil 117A of the second plurality of airfoils when the gas turbine engine 10 is operating at a maximum rated, or certified, speed (i.e., operating at a redline speed).

Notably, however, in other exemplary embodiment, if the first rotating component 110 is rotated at a higher rotational speed than the second rotating component 120, then the maximum $AN^2$ value would be calculated based on an exit annulus area at the aft-most airfoil of the first rotating component and a rotational speed of the aft-most airfoil of the first rotating component.

For the exemplary turbine depicted in FIG. 13, the maximum $AN^2$ value (i.e., the product of the exit annulus area and the square of the rated rotational speed of the first rotational component) may be greater than about $27 \times 10^9$ inches×RPM$^2$ and less than about $77 \times 10^9$ inches×RPM$^2$. For example, in certain exemplary embodiments, the product of the exit annulus area and the square of the rated rotational speed of the first rotational component ($AN^2$) may be greater than about $32 \times 10^9$ inches×RPM$^2$ and less than about $64 \times 10^9$ inches×RPM$^2$, such as greater than about $38 \times 10^9$ inches×RPM$^2$ and less than about $54 \times 10^9$ inches×RPM$^2$.

Figure 14:
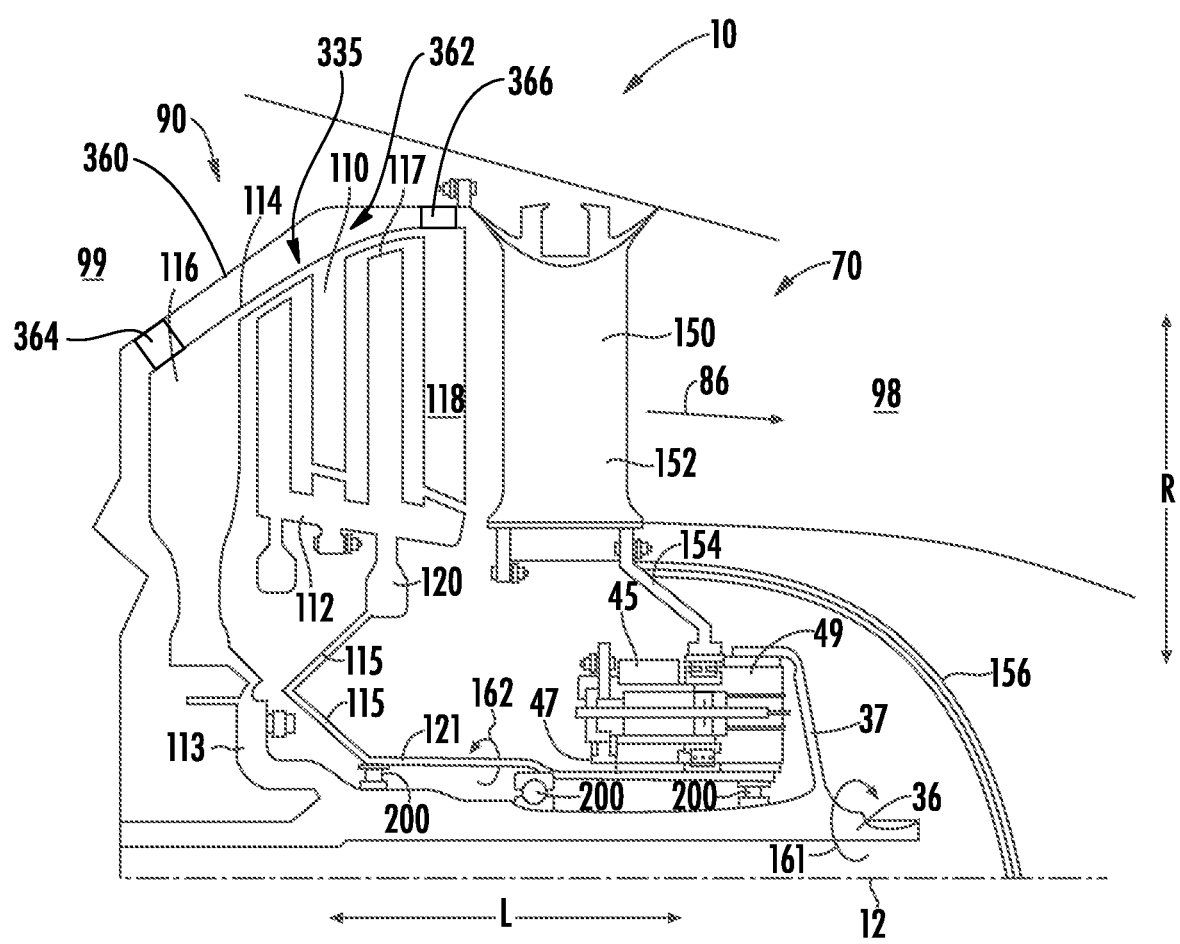
FIG. 14 is a schematic cross sectional view of an exemplary turbine section of a gas turbine engine and reduction gearbox in accordance with another exemplary embodiment of the present disclosure.

Referring now to FIG. 14, a gas turbine engine 10 in accordance with yet another exemplary embodiment of the present disclosure is provided. The exemplary gas turbine engine 10 of FIG. 14 may be configured in substantially the same manner as the exemplary gas turbine engine 10 of FIG. 2 discussed above. As such, it will be appreciated that the gas turbine engine 10 includes a first rotating component 110 and a second rotating component 120, with the first and second rotating components 110, 120 together forming at least in part a turbine. The first rotating component 110 includes a first shroud and the second rotating component 120 includes the second shroud. The first shroud, the second shroud, or both is configured as an outer shroud 114 defining an outer surface 335. Particularly, for the embodiment shown, the first shroud is configured as the outer shroud 114 defining the outer surface 335. However, in other embodiments, the second shroud may additionally, or alternatively, form the outer shroud 114.

The gas turbine engine 10 further includes a casing 360 surrounding at least a portion of the turbine section, and in particular, surrounds at least a portion of the turbine formed by the first and second rotating components 110, 120. For the embodiment shown, an annular turbine cavity 362 is defined outward of the outer surface 335 of the outer shroud 114 along the radial direction R and inward of the casing 360 along the radial direction R. A forward seal 364 is positioned proximate a forward end of the annular turbine cavity 362 and an aft seal 366 is positioned proximate an aft end of the annular turbine cavity 362. The forward seal 364 and the aft seal 366 are each rotating to stationary airflow seals located between at least a portion of the outer shroud 114 and at least a portion of the casing 360.

For the embodiment shown, the forward seal 364, the aft seal 366, or both is more specifically configured as an aspirating face seal (sometimes also referred to as a "hybrid radial seal"). For example, the aspirating face seal may include a gas bearing between a rotatable surface of the outer shroud 114 and a stationary surface of the casing 360 along with additional structure to provide a desired seal. Exemplary embodiments of aspirating face seals as may be incorporated into the embodiment depicted in FIG. 14 are described in U.S. Patent Application Publication No. 2019/0093496 filed on Nov. 2, 2018 (assigned to General Electric Company); U.S. Patent Application Publication No. 2019/0072186 filed on Sep. 6, 2017 (assigned to General Electric Company); and U.S. Patent Application Publication No. 2019/0203842 filed on Mar. 8, 2019 (assigned to General Electric Company).

Inclusion of an aspirating face seal as the forward seal 364, the aft seal 366, or both, may facilitate effective sealing for the annular turbine cavity 362 despite, e.g., relatively high rotational speeds and a relatively radially outward positioning of the seal.

Figure 15:
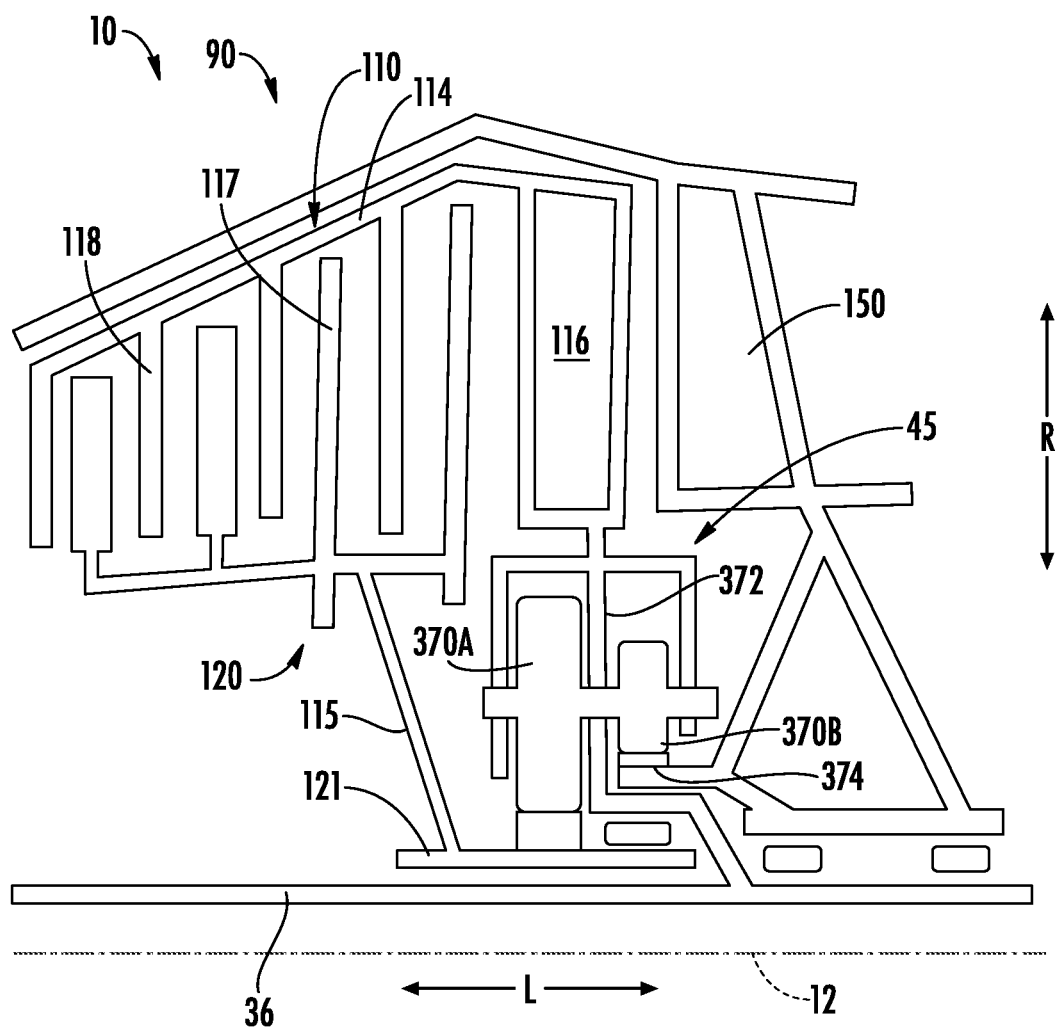
FIG. 15 is a schematic cross sectional view of an exemplary turbine section of a gas turbine engine and reduction gearbox in accordance with yet another exemplary embodiment of the present disclosure.

Referring now to FIG. 15, a gas turbine engine 10 in accordance with yet another exemplary embodiment of the present disclosure is provided. The exemplary gas turbine engine 10 of FIG. 15 may be configured in substantially the same manner as the exemplary gas turbine engine 10 of FIG. 2, discussed above. As such, it will be appreciated that the gas turbine engine 10 includes a first rotating component 110 and a second rotating component 120, with the first and second rotating components 110, 120 together forming at least in part a turbine. The first rotating component 110 includes a first shroud and a first plurality of airfoils extending from the first shroud, and the second rotating component 120 includes a second shroud and a second plurality of airfoils extending from the first shroud. Particularly, for the embodiment shown, the first shroud is configured as an outer shroud 114, the plurality of first shroud airfoils is configured as a plurality of outer shroud airfoils 118, the second shroud is configured as an inner shroud 112, and the plurality of second shroud airfoils is configured as a plurality of inner shroud airfoils 117.

Further for the embodiment depicted in FIG. 15, the gas turbine engine includes a driveshaft 36 and a gearbox 45, the gearbox 45 having an input gear 47 and an output. The second rotating component is coupled to the input gear 47 of the gearbox 45 and the driveshaft 36 is coupled to the output of the gearbox 45.

However, for the embodiment shown, the first rotating component 110 is coupled to the driveshaft 36 through the gearbox 45, as opposed to a direct connection. More specifically, for the embodiment shown, the gearbox 45 is configured as a planetary gear box incorporating compound planetary gears 370. The compound planetary gears 370 more particularly include a first planet gear 370A and a second planet gear 370B spaced along the longitudinal direction L. For the embodiment shown, the first planet gear 370A is positioned forward of the second planet gear 370B. The first and second planet gears 370A, 370B are coupled to a planet gear carrier 372. The planet gear carrier 372 is configured to couple the first rotating component 110 to the driveshaft 36 such that the first rotating component 110 rotates with the drive shaft 36.

More specifically, still, for the embodiment shown the second planet gear 370B is coupled to the second rotating component 120, and more specifically, is coupled to a shaft 121, with the shaft 121 in turn coupled to the second rotating component 120 through a rotor 115. The gas turbine engine 10 further includes an engine frame, which for the embodiment shown is configured as an exhaust frame 150. The exhaust frame 150 includes a stationary gear 374 that is fixed in position. The second planet gear 370B meshes with the stationary gear 374 of the engine frame. In such a manner, the gearbox 45 may allow for counter-rotation between the first rotating component 110 and the second rotating component 120, while providing power from both the first rotating component 110 and the second rotating component 120 to the driveshaft 36.

It will be appreciated that with such a configuration, the connecting airfoils 116 are located at an aft stage of the turbine, and more specifically, at an aft-most stage of the turbine. The gearbox 45 configuration of FIG. 15 may allow for such a configuration.

Figure 16:
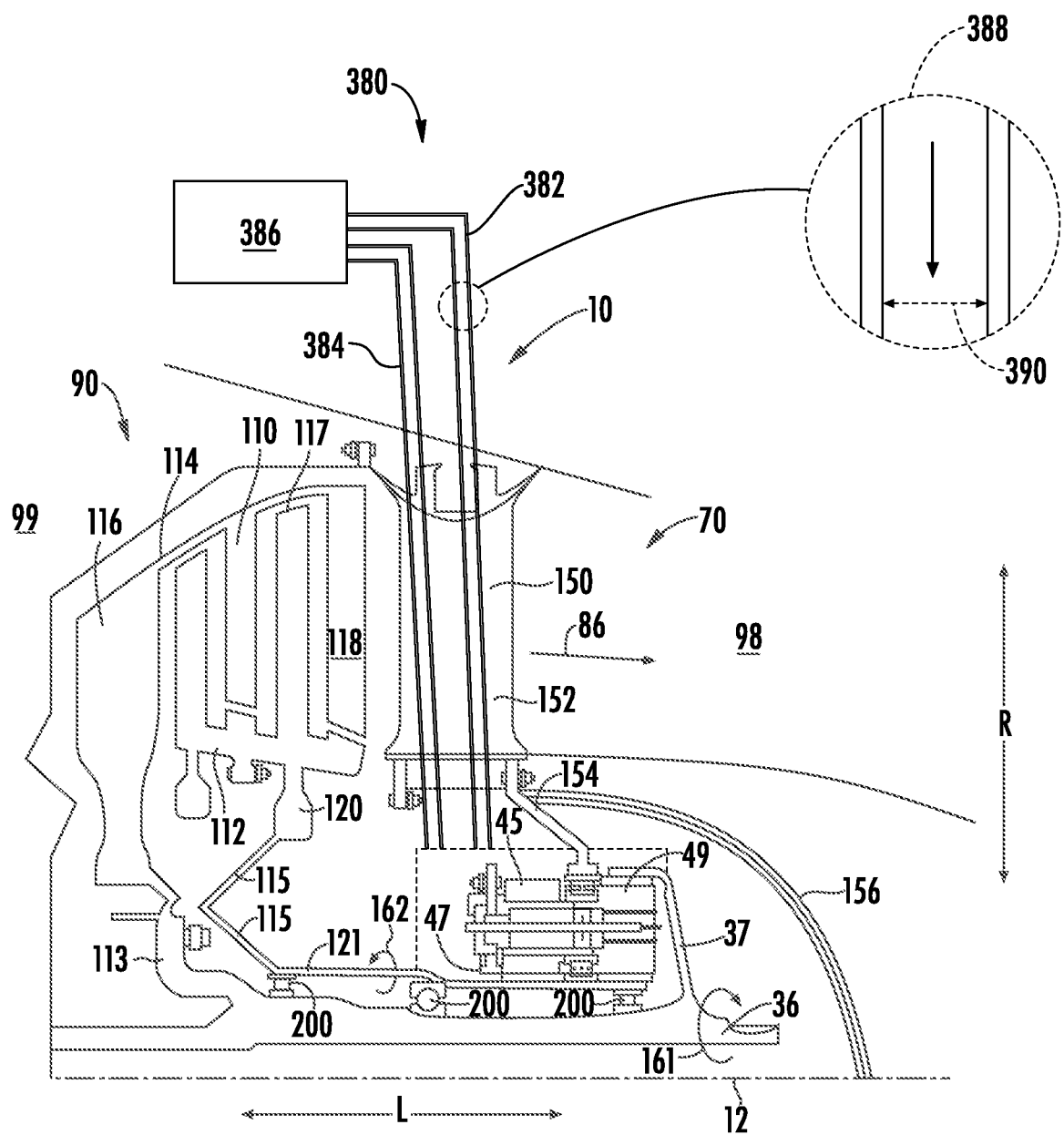
FIG. 16 is a schematic cross sectional view of an exemplary turbine section of a gas turbine engine and reduction gearbox in accordance with still another exemplary embodiment of the present disclosure.

Referring now to FIG. 16, a gas turbine engine 10 in accordance with still another exemplary embodiment of the present disclosure is provided. The exemplary gas turbine engine 10 of FIG. 16 may be configured in substantially the same manner as the exemplary gas turbine engine 10 of FIG. 2, discussed above. As such, it will be appreciated that the gas turbine engine 10 includes a first rotating component 110 and a second rotating component 120, with the first and second rotating components 110, 120 together forming at least in part a turbine. Further for the embodiment depicted in FIG. 16, the gas turbine engine includes a driveshaft 36 and a gearbox 45, the gearbox 45 having an input gear 47 and an output gear 49. The second rotating component is coupled to the input gear 47 of the gearbox 45 and the driveshaft 36 is coupled to the output of the gearbox 45.

Moreover, for the exemplary embodiment depicted, the gas turbine engine 10 includes an oil system 380 for providing an oil flow to and from the gearbox 45. Specifically, for the embodiment shown, the oil system 380 is fluidly coupled to the gearbox 45 through an oil supply line 382 for providing lubrication oil to the gearbox 45 and an oil scavenge line 384 for receiving lubrication oil from the group gearbox 45. Notably, although a single oil supply line 382 and a single oil scavenge line 384 is depicted in FIG. 16, in other embodiments, any other suitable number of lubrication oil supply lines 382 and/or lubrication oil scavenge lines 384 may be provided.

Further, the oil system 380 includes an accessory system 386. The accessory system 286 may include one or more oil supply pumps, oil scavenge pumps, heat exchangers, oil supply tanks, etc. The oil system 380 may be a stand-alone system, or alternatively may be incorporated into, or configured as a part of, one or more other oil systems of the gas turbine engine 10 or vehicle incorporating the gas turbine engine 10.

As described in greater detail above, with the exemplary turbine configuration depicted in FIG. 16, not all of a power provided through the driveshaft 36 flows through the gearbox 45. As such, the oil system 380 may be designed to provide less oil to and from the gearbox 45 during operation, as less oil may be necessary to adequately lubricate and maintain a temperature of the gearbox 45.

Particularly, referring to the embodiment shown, the supply line 382 and scavenge line 384 may be reduced in size. For example, as depicted more clearly and the callout circle 388 of FIG. 16, the supply line 382 may define an inner diameter 390, and therefore an inner cross-sectional area. Similarly, the scavenge line 384 may define an inner diameter and inner cross-sectional area. For the embodiment depicted, the inner cross-sectional area of the supply line 382, and more specifically, the total inner cross-sectional area of all supply lines 382 providing oil to the gearbox 45 (e.g., for embodiments wherein the oil system 380 includes a plurality of supply lines 382 providing oil to the gearbox 45), is between about 0.2 inches squared and about 1.4 inches square. Similarly, the cross-sectional area of the scavenge line 384, and more specifically, the total cross-sectional area of all scavenge lines 384 extracting oil from the gearbox 45, is between about 0.9 inches squared and about 6 inches squared.

By designing the oil supply in accordance with such a configuration, a weight, cost, and complexity of the oil supply may be reduced.

Further aspects of the invention are provided by the subject matter of the following clauses:

A gas turbine engine, wherein the gas turbine engine defines a longitudinal direction, a radial direction, and a circumferential direction, and a forward end and an aft end along the longitudinal direction, the gas turbine engine including: a turbine section including a first rotating component and a second rotating component along the longitudinal direction and a rotor, wherein the first rotating component includes a first shroud and a plurality of first shroud airfoils extended from the first shroud along the radial direction and one or more connecting airfoils coupling the first shroud to the rotor, and wherein the second rotating component includes a second shroud and a plurality of second shroud airfoils extended from the shroud along the radial direction; a gearbox including an input gear and an output gear, wherein the second rotating component is coupled to the input gear of the gearbox; a driveshaft extended in the longitudinal direction, wherein the driveshaft is connected to the output gear of the gearbox, and wherein the rotor is coupled to the driveshaft; wherein the first shroud airfoils of the first rotating component are interdigitated with the second shroud airfoils of the second rotating component to reduce a product of an exit annulus area of the turbine section and the square of a rated rotational speed of the first rotational component, the second rotational component, or both.

The gas turbine engine of the preceding clause, further including: an electric machine including an EM rotor, the EM rotor coupled to the first rotating component or the second rotating component.

The gas turbine engine of any of the preceding clauses wherein the EM rotor of the electric machine is coupled to the first rotating component through the driveshaft.

The gas turbine engine of any of the preceding clauses, further including: an EM gearbox, wherein the EM rotor of the electric machine is coupled to the driveshaft through the EM gearbox.

The gas turbine engine of any of the preceding clauses, further including: a frame, wherein the electric machine further includes an EM stator operable with the EM rotor of the electric machine, wherein the EM stator is coupled to the frame.

The gas turbine engine of any of the preceding clauses, further including: a fan section including a fan, wherein the first and second rotating components together form a turbine, and wherein the turbine is rotatably decoupled from the fan.

The gas turbine engine of any of the preceding clauses, further including: a fan section including a fan, wherein the first and second rotating components together form a turbine, and wherein the turbine is rotatably coupled to the fan through the driveshaft such that the turbine physically rotates the fan.

The gas turbine engine of any of the preceding clauses, wherein the EM rotor is a first EM rotor, wherein the electric machine further includes a second EM rotor and an EM stator, wherein the first EM rotor is rotatable with the first rotating component, wherein the second EM rotor is rotatable with the second rotating component, and wherein the first and second EM rotors are each operable with the EM stator.

The gas turbine engine of any of the preceding clauses, wherein the second rotating component is coupled to an input shaft, and wherein the EM rotor of the electric machine is coupled to the second rotating component through the input shaft.

The gas turbine engine of any of the preceding clauses, wherein the first shroud, the second shroud, or both is configured as an outer shroud defining an outer surface, and wherein the gas turbine engine further includes: an active clearance control system operable with the outer surface of the outer shroud.

The gas turbine engine of any of the preceding clauses0, wherein the active clearance control system includes a cooling air duct in airflow communication with a cooling air source and a cooling air manifold, wherein the cooling air manifold is configured to receive a cooling airflow from the cooling air duct and provide the cooling airflow onto the outer surface of the outer shroud.

The gas turbine engine of any of the preceding clauses1, wherein the cooling air manifold extends generally along the longitudinal direction and defines a plurality of cooling air outlets spaced along the longitudinal direction.

The gas turbine engine of any of the preceding clauses1, wherein the manifold extends less than completely around the outer shroud along the circumferential direction.

The gas turbine engine of any of the preceding clauses, wherein the first shroud, the second shroud, or both is configured as an outer shroud defining an outer surface, and wherein the gas turbine engine further includes: a casing surrounding at least a portion of a turbine section; and an aspirating face seal located between at least a portion of the outer shroud and at least a portion of the casing for forming an airflow seal.

The gas turbine engine of any of the preceding clauses4, wherein the aspirating face seal includes a gas bearing between a rotatable surface of the outer shroud and a stationary surface of the casing.

The gas turbine engine of any of the preceding clauses, wherein the first and second rotating components together form a turbine, wherein the turbine includes between about 3 and 10 stages of rotating airfoils.

The gas turbine engine of any of the preceding clauses, wherein the first and second rotating components together form a turbine including a plurality of rotating airfoils, wherein the plurality of rotating airfoils includes a forward-most rotating airfoil and an aft-most rotating airfoil, wherein the turbine defines an axial length from a leading edge of the forward-most rotating airfoil to a trailing edge of the aft-most rotating airfoil, wherein the turbine further defines a total axial separation defined between each axially-adjacent pair of rotating airfoils of the plurality of rotating airfoils, and wherein the total axial separation is less than about 30% of the axial length of the turbine.

The gas turbine engine of any of the preceding clauses, wherein the total axial separation is less than about 25% of the axial length of the turbine and greater than about 2% of the axial length of the turbine.

The gas turbine engine of any of the preceding clauses, wherein the total axial separation is less than about 20% of the axial length of the turbine The gas turbine engine of any of the preceding clauses, further including: a thrust bearing supporting the first and second rotating components located proximate the turbine section.

The gas turbine engine of any of the preceding clauses, wherein the thrust bearing is a ball bearing.

The gas turbine engine of any of the preceding clauses, further including: a thrust bearing supporting the first and second rotating components located proximate the turbine section.

The gas turbine engine of any of the preceding clauses, wherein the first and second rotating components together form a turbine including a plurality of rotating airfoils, wherein the plurality of rotating airfoils comprises an aft-most high speed rotating airfoil, wherein the exit annulus area is a value in square inches (A) defined at the aft-most high speed rotating airfoil and the rated rotational speed is a rated rotational speed of the aft-most high speed rotating airfoil in revolutions per minute (N), wherein the product of the exit annulus area and the square of the rated rotational speed of the first rotational component ($AN^2$) is greater than about $27 \times 10^9$ inches×$RPM^2$ and less than about $77 \times 10^9$ inches×$RPM^2$.

The gas turbine engine of any of the preceding clauses, wherein the product of the exit annulus area and the square of the rated rotational speed of the first rotational component ($AN^2$) is greater than about $32 \times 10^9$ inches×$RPM^2$ and less than about $64 \times 10^9$ inches×$RPM^2$.

The gas turbine engine of any of the preceding clauses, wherein the product of the exit annulus area and the square of the rated rotational speed of the first rotational component ($AN^2$) is greater than about $38 \times 10^9$ inches×$RPM^2$ and less than about $54 \times 10^9$ inches×$RPM^2$.

The gas turbine engine of any of the preceding clauses, wherein the gearbox includes a compound stepped planet gear assembly, wherein the compound planet gear assembly includes a first planet gear and a second planet gear spaced along the longitudinal direction, and wherein the second planet gear is stepped down in size relative to the first planet gear.

The gas turbine engine of any of the preceding clauses, further including: an engine frame, the engine frame including a stationary gear, wherein the second planet gear meshes with the stationary gear of the engine frame.

The gas turbine engine of any of the preceding clauses, wherein the engine frame is an exhaust frame.

The gas turbine engine of any of the preceding clauses, wherein the gearbox includes a planet gear carrier, and wherein the rotor is coupled to the driveshaft through the planet gear carrier.

The gas turbine engine of any of the preceding clauses, further including: a combustion section, wherein the gearbox is located forward of the combustion section.

The gas turbine engine of any of the preceding clauses, wherein the gearbox is located proximate the turbine section of the gas turbine engine.

The gas turbine engine of any of the preceding clauses, wherein the first shroud is an outer shroud, wherein the plurality of first shroud airfoils extend inward from the first shroud along the radial direction, wherein the second shroud is an inner shroud, wherein the plurality of second shroud airfoils extend outward from the second shroud along the radial direction.

The gas turbine engine of any of the preceding clauses, wherein the first rotating component is a low speed rotating component and the second rotating component is a high speed rotating component.

The gas turbine engine of any of the preceding clauses, wherein the driveshaft is connected to the gearbox through a flexible connector.

The gas turbine engine of any of the preceding clauses, wherein the first shroud airfoils of the first rotating component are interdigitated with the second shroud airfoils of the second rotating component to reduce the product of the exit annulus area of the turbine section and the square of a rated rotational speed of the second rotational component A gas turbine engine, wherein the gas turbine engine defines a longitudinal direction, a radial direction, and a circumferential direction, and a forward end and an aft end along the longitudinal direction, the gas turbine engine including: a turbine section including a first rotating component and a second rotating component along the longitudinal direction, and a first rotor and a second rotor; wherein the first rotating component is connected to the first rotor, the first rotating component including a first shroud including a plurality of first shroud airfoils extended from the first shroud along the radial direction and one or more connecting airfoils; and wherein the second rotating component is connected to the second rotor, the second rotating component including a second shroud defining a plurality of second shroud airfoils extended from the second shroud along the radial direction; a gearbox including an input gear and an output gear, wherein the second rotor is coupled to the input gear of the gearbox; a driveshaft extended in the longitudinal direction, wherein the driveshaft is connected to the output gear of the gearbox, and wherein the first rotor is coupled to the driveshaft; and an oil supply including one or more supply lines for providing a supply oil flow to the gearbox and one or more scavenge lines for removing a scavenged oil flow from the gearbox, wherein the one or more supply lines define a total internal cross-sectional area between about 0.2 inches squared and 1.4 inches squared; and wherein the one or more scavenge lines define a total internal cross-sectional area between about 0.9 inches squared and 6 inches squared.

The gas turbine engine of any of the preceding clauses, wherein the one or more supply lines provide substantially all of the supply oil flow to the gearbox, and wherein the one or more scavenge lines remove substantially all of the scavenged oil flow from the gearbox.

The gas turbine engine of any of the preceding clauses, further including: a combustion section, wherein the gearbox is located forward of the combustion section.

The gas turbine engine of any of the preceding clauses, further including: a compressor, wherein the first rotating component is coupled to the gearbox through a shaft defining a torque path, and wherein the shaft is further coupled to the compressor at a location along the torque path between the first rotating component and the gearbox.

The gas turbine engine of any of the preceding clauses, wherein the compressor is a low pressure compressor.

The gas turbine engine of any of the preceding clauses, wherein the engine defines a torque path from the first rotating component to driveshaft to a fan rotor of a fan assembly, and from the second rotating component to the input shaft to the gearbox, and from the gearbox to the driveshaft to the fan rotor.

The gas turbine engine of any of the preceding clauses, wherein the gearbox defines a gear ratio of about −1.5:1 to about −3:1.

The gas turbine engine of any of the preceding clauses, wherein the second rotating component rotates at a speed greater than the first rotating component.

The gas turbine engine of any of the preceding clauses, wherein the first rotating component rotates in a first direction and the second rotating component rotates in a second direction opposite of the first direction.

A gas turbine engine, wherein the gas turbine engine defines a longitudinal direction, a radial direction, and a circumferential direction, and a forward end and an aft end along the longitudinal direction, the gas turbine engine including: a turbine section comprising a first rotating component and a second rotating component along the longitudinal direction together forming at least in part a turbine of the turbine section, and a first rotor and a second rotor; wherein the first rotating component is connected to the first rotor, the first rotating component including a first shroud comprising a plurality of first shroud airfoils extended from the first shroud along the radial direction and one or more connecting airfoils; wherein the second rotating component is connected to the second rotor, the second rotating component including a second shroud defining a plurality of second shroud airfoils extended from the second shroud along the radial direction; and wherein the turbine has an axial length L and N number of stages, wherein a sum total of axial spacings dx separating each of a plurality of adjacent first shroud and second shroud airfoils is related to N and L by $L(A/(N-1)) < dx < L(B/(N-1))$, where A is between 0.05 and 0.15 and B is between 0.25 and 0.40; a gearbox comprising an input gear and an output gear, wherein the second rotor is coupled to the input gear of the gearbox; and a driveshaft extended in the longitudinal direction, wherein the driveshaft is connected to the output gear of the gearbox, and wherein the first rotor is coupled to the driveshaft.

The gas turbine engine of any of the preceding clauses, wherein A is 0.15 and B is 0.25.

The gas turbine engine of any of the preceding clauses, wherein the sum total of the axial spacings is between about 5% and 40% of the total length.

The gas turbine engine of any of the preceding clauses, wherein the sum total of the axial spacings is between about 10% and 30% of the total length.

The gas turbine engine of any of the preceding clauses, wherein the sum total of the axial spacings is between about 15% and 25% of the total length.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, wherein the gas turbine engine defines a longitudinal direction, a radial direction, and a circumferential direction, and a forward end and an aft end along the longitudinal direction, the gas turbine engine comprising:
    a turbine section comprising a first rotating component and a second rotating component along the longitudinal direction and a rotor, wherein the first rotating component includes a first shroud and a plurality of first shroud airfoils extended from the first shroud along the radial direction and one or more connecting airfoils coupling the first shroud to the rotor, and wherein the second rotating component includes a second shroud and a plurality of second shroud airfoils extended from the shroud along the radial direction;
    a gearbox comprising an input gear and an output gear, wherein the second rotating component is coupled to the input gear of the gearbox;
    a driveshaft extended in the longitudinal direction, wherein the driveshaft is connected to the output gear of the gearbox, and wherein the rotor is coupled to the driveshaft;
    wherein the first shroud airfoils of the first rotating component are interdigitated with the second shroud airfoils of the second rotating component to reduce a product of an exit annulus area of the turbine section and the square of a rated rotational speed of the first rotational component, the second rotational component, or both.

2. The gas turbine engine of claim 1, further comprising:
    an electric machine comprising an EM rotor, the EM rotor coupled to the first rotating component or the second rotating component.

3. The gas turbine engine of claim 2, wherein the EM rotor of the electric machine is coupled to the first rotating component through the driveshaft.

4. The gas turbine engine of claim 3, further comprising:
    an EM gearbox, wherein the EM rotor of the electric machine is coupled to the driveshaft through the EM gearbox.

5. The gas turbine engine of claim 3, further comprising:
    a frame, wherein the electric machine further comprises an EM stator operable with the EM rotor of the electric machine, wherein the EM stator is coupled to the frame.

6. The gas turbine engine of claim 3, further comprising:
    a fan section comprising a fan, wherein the first and second rotating components together form a turbine, and wherein the turbine is rotatably decoupled from the fan.

7. The gas turbine engine of claim 3, further comprising:
    a fan section comprising a fan, wherein the first and second rotating components together form a turbine, and wherein the turbine is rotatably coupled to the fan through the driveshaft such that the turbine physically rotates the fan.

8. The gas turbine engine of claim 2, wherein the EM rotor is a first EM rotor, wherein the electric machine further comprises a second EM rotor and an EM stator, wherein the first EM rotor is rotatable with the first rotating component, wherein the second EM rotor is rotatable with the second rotating component, and wherein the first and second EM rotors are each operable with the EM stator.

9. The gas turbine engine of claim 2, wherein the second rotating component is coupled to an input shaft, and wherein the EM rotor of the electric machine is coupled to the second rotating component through the input shaft.

10. The gas turbine engine of claim 1, wherein the first shroud, the second shroud, or both is configured as an outer shroud defining an outer surface, and wherein the gas turbine engine further comprises:
an active clearance control system operable with the outer surface of the outer shroud.

11. The gas turbine engine of claim 10, wherein the active clearance control system comprises a cooling air duct in airflow communication with a cooling air source and a cooling air manifold, wherein the cooling air manifold is configured to receive a cooling airflow from the cooling air duct and provide the cooling airflow onto the outer surface of the outer shroud.

12. The gas turbine engine of claim 11, wherein the cooling air manifold extends generally along the longitudinal direction and defines a plurality of cooling air outlets spaced along the longitudinal direction.

13. The gas turbine engine of claim 11, wherein the manifold extends less than completely around the outer shroud along the circumferential direction.

14. The gas turbine engine of claim 1, wherein the first shroud, the second shroud, or both is configured as an outer shroud defining an outer surface, and wherein the gas turbine engine further comprises:
a casing surrounding at least a portion of a turbine section; and
an aspirating face seal located between at least a portion of the outer shroud and at least a portion of the casing for forming an airflow seal.

15. The gas turbine engine of claim 14, wherein the aspirating face seal comprises a gas bearing between a rotatable surface of the outer shroud and a stationary surface of the casing.

16. The gas turbine engine of claim 1, wherein the first and second rotating components together form a turbine, wherein the turbine comprises between about 3 and 10 stages of rotating airfoils.

17. The gas turbine engine of claim 1, wherein the first and second rotating components together form a turbine comprising a plurality of rotating airfoils, wherein the plurality of rotating airfoils comprises a forward-most rotating airfoil and an aft-most rotating airfoil, wherein the turbine defines an axial length from a leading edge of the forward-most rotating airfoil to a trailing edge of the aft-most rotating airfoil, wherein the turbine further defines a total axial separation defined between each axially-adjacent pair of rotating airfoils of the plurality of rotating airfoils, and wherein the total axial separation is less than about 30% of the axial length of the turbine.

18. The gas turbine engine of claim 17, wherein the total axial separation is less than about 25% of the axial length of the turbine and greater than about 2% of the axial length of the turbine.

19. The gas turbine engine of claim 17, wherein the total axial separation is less than about 20% of the axial length of the turbine.

20. The gas turbine engine of claim 17, further comprising:
a thrust bearing supporting the first and second rotating components located proximate the turbine section.

21. The gas turbine engine of claim 20, wherein the thrust bearing is a ball bearing.

22. The gas turbine engine of claim 1, further comprising:
a thrust bearing supporting the first and second rotating components located proximate the turbine section.

23. The gas turbine engine of claim 1, wherein the first and second rotating components together form a turbine comprising a plurality of rotating airfoils, wherein the plurality of rotating airfoils comprises an aft-most high speed rotating airfoil, wherein the exit annulus area is a value in square inches (A) defined at the aft-most high speed rotating airfoil and the rated rotational speed is a rated rotational speed of the aft-most high speed rotating airfoil in revolutions per minute (N), wherein the product of the exit annulus area and the square of the rated rotational speed of the first rotational component ($AN^2$) is greater than about $27 \times 10^9$ inches×$RPM^2$ and less than about $77 \times 10^9$ inches×$RPM^2$.

24. The gas turbine engine of claim 23, wherein the product of the exit annulus area and the square of the rated rotational speed of the first rotational component ($AN^2$) is greater than about $32 \times 10^9$ inches×$RPM^2$ and less than about $64 \times 10^9$ inches×$RPM^2$.

25. The gas turbine engine of claim 23, wherein the product of the exit annulus area and the square of the rated rotational speed of the first rotational component ($AN^2$) is greater than about $38 \times 10^9$ inches×$RPM^2$ and less than about $54 \times 10^9$ inches×$RPM^2$.

26. The gas turbine engine of claim 1, wherein the gearbox comprises a compound stepped planet gear assembly, wherein the compound planet gear assembly comprises a first planet gear and a second planet gear spaced along the longitudinal direction, and wherein the second planet gear is stepped down in size relative to the first planet gear.

27. The gas turbine engine of claim 26, further comprising:
an engine frame, the engine frame comprising a stationary gear, wherein the second planet gear meshes with the stationary gear of the engine frame.

28. The gas turbine engine of claim 27, wherein the engine frame is an exhaust frame.

29. The gas turbine engine of claim 26, wherein the gearbox comprises a planet gear carrier, and wherein the rotor is coupled to the driveshaft through the planet gear carrier.

30. The gas turbine engine of claim 1, further comprising:
a combustion section, wherein the gearbox is located forward of the combustion section.

31. The gas turbine engine of claim 1, wherein the gearbox is located proximate the turbine section of the gas turbine engine.

32. The gas turbine engine of claim 1, wherein the first shroud is an outer shroud, wherein the plurality of first shroud airfoils extend inward from the first shroud along the radial direction, wherein the second shroud is an inner shroud, wherein the plurality of second shroud airfoils extend outward from the second shroud along the radial direction.

33. The gas turbine engine of claim 1, wherein the first rotating component is a low speed rotating component and the second rotating component is a high speed rotating component.

34. The gas turbine engine of claim 1, wherein the driveshaft is connected to the gearbox through a flexible connector.

35. The gas turbine engine of claim 1, wherein the first shroud airfoils of the first rotating component are interdigitated with the second shroud airfoils of the second rotating component to reduce the product of the exit annulus area of the turbine section and the square of a rated rotational speed of the second rotational component.

36. A gas turbine engine, wherein the gas turbine engine defines a longitudinal direction, a radial direction, and a circumferential direction, and a forward end and an aft end along the longitudinal direction, the gas turbine engine comprising:
- a turbine section comprising a first rotating component and a second rotating component along the longitudinal direction, and a first rotor and a second rotor;
  - wherein the first rotating component is connected to the first rotor, the first rotating component including a first shroud comprising a plurality of first shroud airfoils extended from the first shroud along the radial direction and one or more connecting airfoils; and
  - wherein the second rotating component is connected to the second rotor, the second rotating component including a second shroud defining a plurality of second shroud airfoils extended from the second shroud along the radial direction;
- a gearbox comprising an input gear and an output gear, wherein the second rotor is coupled to the input gear of the gearbox;
- a driveshaft extended in the longitudinal direction, wherein the driveshaft is connected to the output gear of the gearbox, and wherein the first rotor is coupled to the driveshaft; and
- an oil supply comprising one or more supply lines for providing a supply oil flow to the gearbox and one or more scavenge lines for removing a scavenged oil flow from the gearbox,
  - wherein the one or more supply lines define a total internal cross-sectional area between about 0.2 inches squared and 1.4 inches squared; and
  - wherein the one or more scavenge lines define a total internal cross-sectional area between about 0.9 inches squared and 6 inches squared.

37. The gas turbine engine of claim 36, wherein the one or more supply lines provide substantially all of the supply oil flow to the gearbox, and wherein the one or more scavenge lines remove substantially all of the scavenged oil flow from the gearbox.

38. The gas turbine engine of claim 36, further comprising:
- a combustion section, wherein the gearbox is located forward of the combustion section.

39. The gas turbine engine of claim 36, further comprising:
- a compressor, wherein the first rotating component is coupled to the gearbox through a shaft defining a torque path, and wherein the shaft is further coupled to the compressor at a location along the torque path between the first rotating component and the gearbox.

40. The gas turbine engine of claim 36, wherein the compressor is a low pressure compressor.

41. The gas turbine engine of claim 36, wherein the engine defines a torque path from the first rotating component to driveshaft to a fan rotor of a fan assembly, and from the second rotating component to the input shaft to the gearbox, and from the gearbox to the driveshaft to the fan rotor.

42. The gas turbine engine of claim 36, wherein the gearbox defines a gear ratio of about −1.5:1 to about −3:1.

43. The gas turbine engine of claim 36, wherein the second rotating component rotates at a speed greater than the first rotating component.

44. The gas turbine engine of claim 36, wherein the first rotating component rotates in a first direction and the second rotating component rotates in a second direction opposite of the first direction.

45. A gas turbine engine, wherein the gas turbine engine defines a longitudinal direction, a radial direction, and a circumferential direction, and a forward end and an aft end along the longitudinal direction, the gas turbine engine comprising:
- a turbine section comprising a first rotating component and a second rotating component along the longitudinal direction together forming at least in part a turbine of the turbine section, and a first rotor and a second rotor;
  - wherein the first rotating component is connected to the first rotor, the first rotating component including a first shroud comprising a plurality of first shroud airfoils extended from the first shroud along the radial direction and one or more connecting airfoils;
  - wherein the second rotating component is connected to the second rotor, the second rotating component including a second shroud defining a plurality of second shroud airfoils extended from the second shroud along the radial direction; and
  - wherein the turbine has an axial length L and N number of stages, wherein an average axial spacing dx separating each of a plurality of adjacent first shroud and second shroud airfoils is related to N and L by $L(A/(N-1)) < dx < L(B/(N-1))$, where A is between 0.05 and 0.15 and B is between 0.25 and 0.40;
- a gearbox comprising an input gear and an output gear, wherein the second rotor is coupled to the input gear of the gearbox; and
- a driveshaft extended in the longitudinal direction, wherein the driveshaft is connected to the output gear of the gearbox, and wherein the first rotor is coupled to the driveshaft.

46. The gas turbine engine of claim 45, wherein A is 0.15 and B is 0.25.

47. The gas turbine engine of claim 45, wherein a sum total of the axial spacings is between about 5% and 40% of the total axial length L.

48. The gas turbine engine of claim 45, wherein a sum total of the axial spacings is between about 10% and 30% of the total axial length L.

49. The gas turbine engine of claim 45, wherein a sum total of the axial spacings is between about 15% and 25% of the total axial length L.

* * * * *